(12) United States Patent
Yang et al.

(10) Patent No.: US 8,630,628 B2
(45) Date of Patent: Jan. 14, 2014

(54) MULTIMEDIA CALLING METHODS AND SYSTEMS FOR VIDEO PHONES

(75) Inventors: Jian Yang, Shenzhen (CN); Guoqiao Chen, Shenzhen (CN); Lei Wang, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 0 days.

(21) Appl. No.: 13/329,061

(22) Filed: Dec. 16, 2011

(65) Prior Publication Data

US 2012/0086766 A1    Apr. 12, 2012

Related U.S. Application Data

(63) Continuation of application No. 12/495,227, filed on Jun. 30, 2009, which is a continuation of application No. PCT/CN2008/070478, filed on Mar. 12, 2008.

(30) Foreign Application Priority Data

Mar. 31, 2007  (CN) .......................... 2007 1 0073941
Sep. 4, 2007   (CN) .......................... 2007 1 0149813

(51) Int. Cl.
   *H04M 3/42*   (2006.01)
   *H04N 7/14*   (2006.01)
   *G06F 15/16*  (2006.01)

(52) U.S. Cl.
   USPC .................. 455/414.1; 348/14.01; 348/14.02; 348/14.1; 709/204

(58) Field of Classification Search
   None
   See application file for complete search history.

(56) References Cited

U.S. PATENT DOCUMENTS 6,195,543 B1    2/2001   Granberg
(Continued)

FOREIGN PATENT DOCUMENTS

CN    1267432 A    9/2000
CN    1556643 A    12/2004
(Continued)

OTHER PUBLICATIONS

WO 2006/122496, Zhang et al., System for Realizing Multimedia Ring Back Tone Service and Method Thereof, Nov. 23, 2006.*

(Continued)

*Primary Examiner* — Ariel Balaoing
*Assistant Examiner* — Christopher Kohlman
(74) *Attorney, Agent, or Firm* — Huawei Technologies Co., Ltd.

(57) ABSTRACT

A calling method for performing a video phone call including: establishing a bearer of a video phone call between a calling terminal and a Multimedia Ring Back Tone (MRBT) device; playing, by the MRBT device, a MRBT to the calling terminal via the bearer between the calling terminal and the MRBT device; sending, by a MSC server of the calling terminal, a prompt message to the calling terminal; removing the bearer between the calling terminal and the MRBT device upon receiving the prompt message; establishing another bearer of the video phone call between the calling terminal and a called terminal; and performing a video phone call communication between the calling terminal and the called terminal via the bearer between the calling terminal and the called terminal. The present invention also provides the corresponding systems, thereby realizing the Multimedia Ring Back Tone service of a video phone call.

26 Claims, 12 Drawing Sheets

(56) References Cited

U.S. PATENT DOCUMENTS

| | | |
|---|---|---|
| 7,693,134 B2 | 4/2010 | Batni et al. |
| 7,912,198 B2 | 3/2011 | Zhang et al. |
| 2006/0147010 A1 | 7/2006 | Batni et al. |
| 2007/0053344 A1 | 3/2007 | Liukkonen et al. |
| 2007/0268359 A1* | 11/2007 | Zhang et al. ............... 348/14.01 |
| 2007/0291106 A1* | 12/2007 | Kenrick et al. ............ 348/14.01 |
| 2008/0037740 A1* | 2/2008 | Yoakum et al. ......... 379/142.01 |
| 2008/0045209 A1 | 2/2008 | Mo |
| 2008/0129815 A1 | 6/2008 | Jiang |
| 2011/0150203 A1* | 6/2011 | Stille et al. ............... 379/207.16 |

FOREIGN PATENT DOCUMENTS

| | | | | |
|---|---|---|---|---|
| CN | 1671160 A | | 9/2005 | |
| CN | PCT/CN06/00994 | * | 5/2006 | |
| CN | 1812561 A | | 8/2006 | |
| CN | 1845569 A | | 10/2006 | |
| CN | 1859475 A | | 11/2006 | |
| CN | 1859496 A | | 11/2006 | |
| CN | 1874373 A | | 12/2006 | |
| CN | 1917531 | * | 2/2007 | ............. H04M 3/42 |
| CN | 1917531 A | | 2/2007 | |
| CN | 1917532 A | | 2/2007 | |
| CN | 101277474 A | | 10/2008 | |
| CN | 100531271 C | | 8/2009 | |
| EP | 1523199 A1 | | 4/2005 | |
| EP | 1677485 A1 | | 7/2006 | |
| EP | 1848189 A1 | | 10/2007 | |
| JP | 2001-119676 A | | 4/2001 | |
| JP | 2006-191594 A | | 7/2006 | |
| WO | 98/59504 A1 | | 12/1998 | |
| WO | 2006122496 A1 | | 11/2006 | |
| WO | 2007009402 A1 | | 1/2007 | |
| WO | 2007/016270 A1 | | 2/2007 | |

OTHER PUBLICATIONS

Office Action of corresponding Chinese Patent Application No. 200710149813.7, mailed Mar. 27, 2009, and an English translation thereof, 13 pages total.

Cover page of corresponding granted Chinese Patent No. 100531271C (Application No. 200710149813.7), issued Aug. 19, 2009, 1 page only.

International Search Report for PCT Application No. PCT/CN2008/070478, mailed May 8, 2008, 4 pages total.

Written Opinion of corresponding PCT Patent Application No. PCT/CN2008/070478, mailed May 8, 2008, 5 pages total.

European Search Report for European Patent Application No. 08715214.6, mailed Sep. 27, 2011, 7 pages total.

Office Action of Japanese Patent Application No. 2009-549763, mailed Sep. 6, 2011, and an English translation thereof, 5 pages total.

3GPP TS 24.008 V5.0.0 Technical Specification: 3rd Generation Partnership Project; Technical Specification Group Core Network; Mobile radio interface layer 3 specification; Core Network Protocols—Stage 3 (Release 5), Jun. 2001, 443 pages total.

First Office Action of Parent U.S. Appl. No. 12/495,227, mailed on Dec. 15, 2011, 24 pages total.

Cover Page of corresponding granted Chinese Patent No. 101635819 B (Application No. 200910160995.7), issued Jan. 12, 2012, 1 page only.

Office Action in related U.S. Appl. No. 12/495,227, mailed Dec. 15, 2011, 24 pages total.

First office action issued in corresponding European patent application No. EP08715214.6, dated Aug. 7, 2012, total 4 pages.

Search report issued in corresponding Chinese patent application No. 201010292578.0, dated Feb. 23, 2012, and English translation thereof, total 7 pages.

The front page of Chinese issued patent CN101969615B, Dec. 12, 2012, 1 page only.

* cited by examiner

MULTIMEDIA CALLING METHODS AND SYSTEMS FOR VIDEO PHONES

CROSS-REFERENCE TO RELATED APPLICATIONS

The application is a continuation of U.S. patent application Ser. No. 12/495,227, filed on Jun. 30, 2009, which is a continuation of International Patent Application No. PCT/CN2008/070478, filed on Mar. 12, 2008. The International Patent Application claims priority to Chinese Patent Application No. 200710073941.8, filed on Mar. 31, 2007, and Chinese Patent Application No. 200710149813.7, filed on Sep. 4, 2007. All of the applications are hereby incorporated by reference in their entireties.

TECHNICAL FIELD

The present disclosure relates to the fields of wireless communications and multimedia techniques, and particularly to calling techniques for a video phone.

BACKGROUND

Multimedia Ring Back Tone is a service customized by the called user to provide a personalized multimedia content instead of the normal ring back tone for calling user. Once a customer applies for the Multimedia Ring Back Tone service, a personalized ring back tone may be set as desired. When this customer is called, the personalized multimedia content is played for the calling user instead of the normal ring back tone. In particular, the personalized multimedia ring back tone may be any music, song, recording, video, etc. If it is a video, the calling user terminal must have a corresponding video media playback function to experience the video, which is then referred to as a Multimedia Ring Back Tone Service (MRBT service) or Multimedia Caller Identification Service (MCID service).

The Multimedia Ring Back Tone service of a video phone is customized by the called user to provide the calling user with a piece of dulcet and euphonic Multimedia Caller Identification, instead of the normal ring back tone, when the called user is called by the calling user using a video phone service.

The video phone service is a point-to-point communication service that may utilize audio and video simultaneously. It enables bidirectional real-time communications of both audio and video between two mobile video terminals, between a mobile video terminal and a stationary video terminal, or between a mobile video terminal and a personal computer (PC).

Currently, the Multimedia Ring Back Tone service of a video phone is achieved by integrating a functional module for implementing the Multimedia Ring Back Tone into the terminals, i.e., if a user downloads and configures Multimedia Ring Back Tones, the terminal of the user plays a Multimedia Ring Back Tone for a calling terminal who calls the terminal of the user using a video phone service. The operators profit by charging information fee from the users who download the Multimedia Ring Back Tones, without reconstruction on the network side of the operators. In particular, the user terminal is a reconstructed video phone terminal, with a functional module of Multimedia Ring Back Tone being added based on the video phone terminal. When a calling request from another terminal is received, the called terminal sends an alerting message to the calling party, and then sends a connecting message to initiate a bearer establishment process. Meanwhile, the Multimedia Ring Back Tone application of the terminal is started to prepare for playing the Multimedia Ring Back Tone content, while a bearer of the Multimedia Ring Back Tone is established between the called terminal and the calling terminal by H.245. After the bearer establishment process is finished, the Multimedia Ring Back Tone module of the called terminal plays the Multimedia Ring Back Tone through the established bearer, while the user of the calling terminal listens or views the content of the Multimedia Ring Back Tone via the bearer of the video phone. Once the called user answers the call, the Multimedia Ring Back Tone module of the called terminal stops playing the content, and transfers the control right to the user of the terminal. Then, the whole process of the Multimedia Ring Back Tone service completes.

However, as discovered by the inventor of the present invention, the prior art schemes require to reconstruct the terminals to add a functional module for implementing the Multimedia Ring Back Tone, so as to play the content of the Multimedia Ring Back Tone during the call. Moreover, the functional module for implementing the Multimedia Ring Back Tone and the functional module for the video phone should be integrated to cooperate with each other. Therefore, the requirement for the terminals is high. If the terminal is to select much Multimedia Ring Back Tone content, the content would be stored locally. Moreover, the operators profit only by charging information fee from the users who download the Multimedia Ring Back Tones, which changes the prior income mode of the operators substantially, and thus departs from the requirements of the operators.

On the other hand, due to the problem of signaling mode, the terminal may incorrectly deem that the communication process of the video phone service has already started while the Multimedia Ring Back Tone is being played. Therefore, it is impossible for the terminals to accurately charge for the communication duration, thereby bringing complaints from the users.

SUMMARY

Embodiments of the present invention provide calling methods and systems for a video phone, thereby implementing the Multimedia Ring Back Tone service of the video phone call at a low cost.

An embodiment of the present invention consists of a method for performing a video phone call, comprising: establishing a bearer of a video phone call between a calling terminal and a Multimedia Ring Back Tone (MRBT) device; playing, by the MRBT device, a MRBT to the calling terminal via the bearer between the calling terminal and the MRBT device; sending, by a MSC server of the calling terminal, a prompt message to the calling terminal; removing the bearer between the calling terminal and the MRBT device upon receiving the prompt message; establishing another bearer of the video phone call between the calling terminal and a called terminal; and performing a video phone call communication between the calling terminal and the called terminal via the bearer between the calling terminal and the called terminal.

Another embodiment of the present invention consists of a system for performing a video phone call, comprising: a bearer establishment unit configured to establish a bearer of a video phone call between a calling terminal and a Multimedia Ring Back Tone (MRBT) device, and establish a bearer of the video phone call between the calling terminal and the called terminal; a MRBT playback unit comprising a interface coupled to the calling terminal and configured to play a MRBT to the calling terminal via the bearer between the calling terminal and the MRBT device; a bearer removal unit configured to remove the bearer between the calling terminal and the MRBT device upon receiving a prompt message from a MSC server of the calling terminal, and instruct the bearer establishment unit to establish the bearer between the calling terminal and the called terminal; and a communication unit configured to perform a video phone call communication between the calling terminal and the called terminal via the bearer between the calling terminal and the called terminal.

Yet another embodiment of the present invention consists of a method for performing a video phone call by a calling terminal, comprising: establishing a bearer of a video phone call between a calling terminal and a Multimedia Ring Back Tone (MRBT) device; receiving a MRBT from the MRBT device via the bearer between the calling terminal and the MRBT device; receiving a prompt message from a MSC server of the calling terminal; removing the bearer between the calling terminal and the MRBT device upon receiving the prompt message; establishing another bearer of the video phone call between the calling terminal and a called terminal; and performing a video phone call communication between the calling terminal and the called terminal via the bearer between the calling terminal and the called terminal.

A further embodiment of the present invention consists of a calling terminal, comprising: a processor coupled to a memory and configured to: establish a bearer of a video phone call between the calling terminal and a Multimedia Ring Back Tone (MRBT) device; receive a MRBT from the MRBT device via the bearer between the calling terminal and the MRBT device; receive a prompt message from a MSC server of the calling terminal; remove the bearer between the calling terminal and the MRBT device upon receiving the prompt message; establish another bearer of the video phone call between the calling terminal and a called terminal; and perform a video phone call communication between the calling terminal and the called terminal via the bearer between the calling terminal and the called terminal.

As compared with the prior art, the Multimedia Ring Back Tone service provided by at least some embodiments of the present invention may provide the following advantages. First, it may be implemented based on the prior network framework for the video phone call. Second, by playing the Multimedia Ring Back Tone to the calling terminal by the Multimedia Ring Back Tone device, it may avoid the reconstruction of the protocol layer for the terminals, thereby minimizing the effect on the terminals caused by implementing the Multimedia Ring Back Tone service of a video phone call.

DETAILED DESCRIPTION

Embodiments of the present invention are further described in detail below in conjunction with the accompanying drawings for further clarifying the purposes, technical schemes and advantages of these embodiments of the present invention.

A first embodiment of the present invention relates to a calling method of a video phone. In this embodiment, a Multimedia Ring Back Tone server plays a Multimedia Ring Back Tone for the calling terminal via a first bearer of a video phone established between the calling terminal and the Multimedia Ring Back Tone server. Once it is detected that the called terminal answers the call, a second bearer of the video phone is established between the called terminal and the Multimedia Ring Back Tone server. A video phone communication may be performed between the calling terminal and the called terminal via the established first and second bearers.

Figure 1:
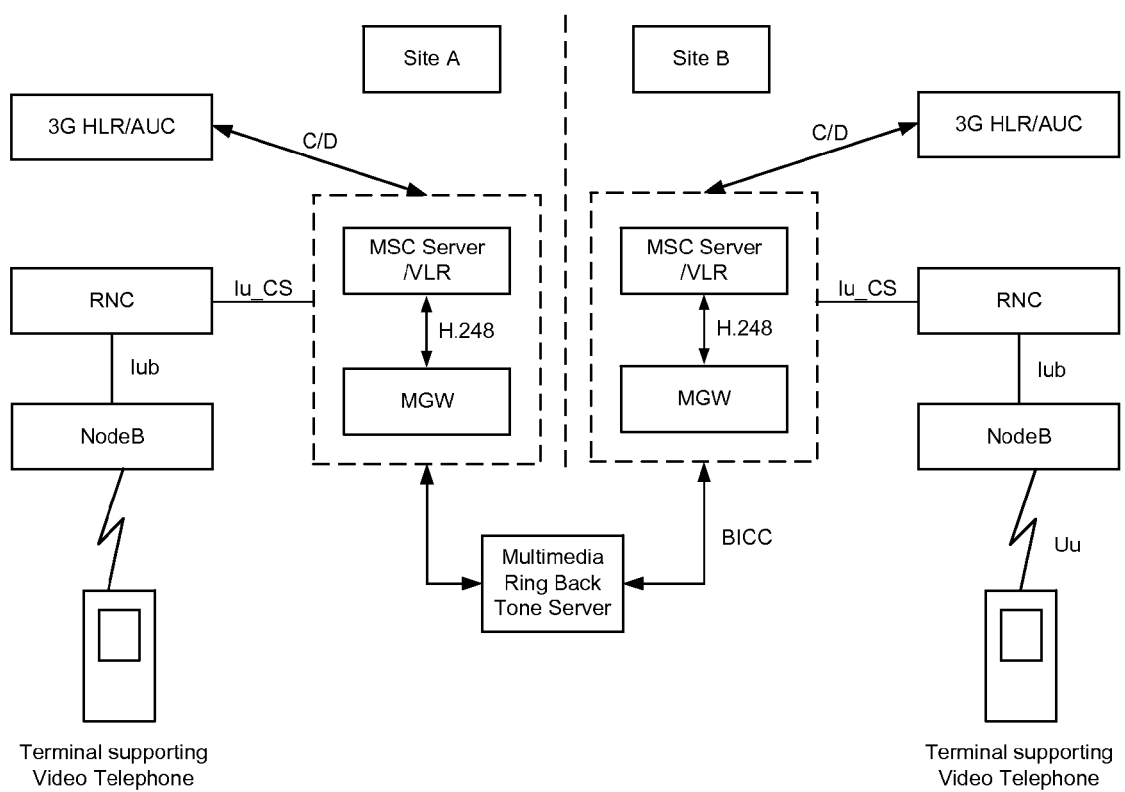
FIG. 1 is a structural diagram of a calling method for the video phone in accordance with a first embodiment of the present invention.
Figure 2:
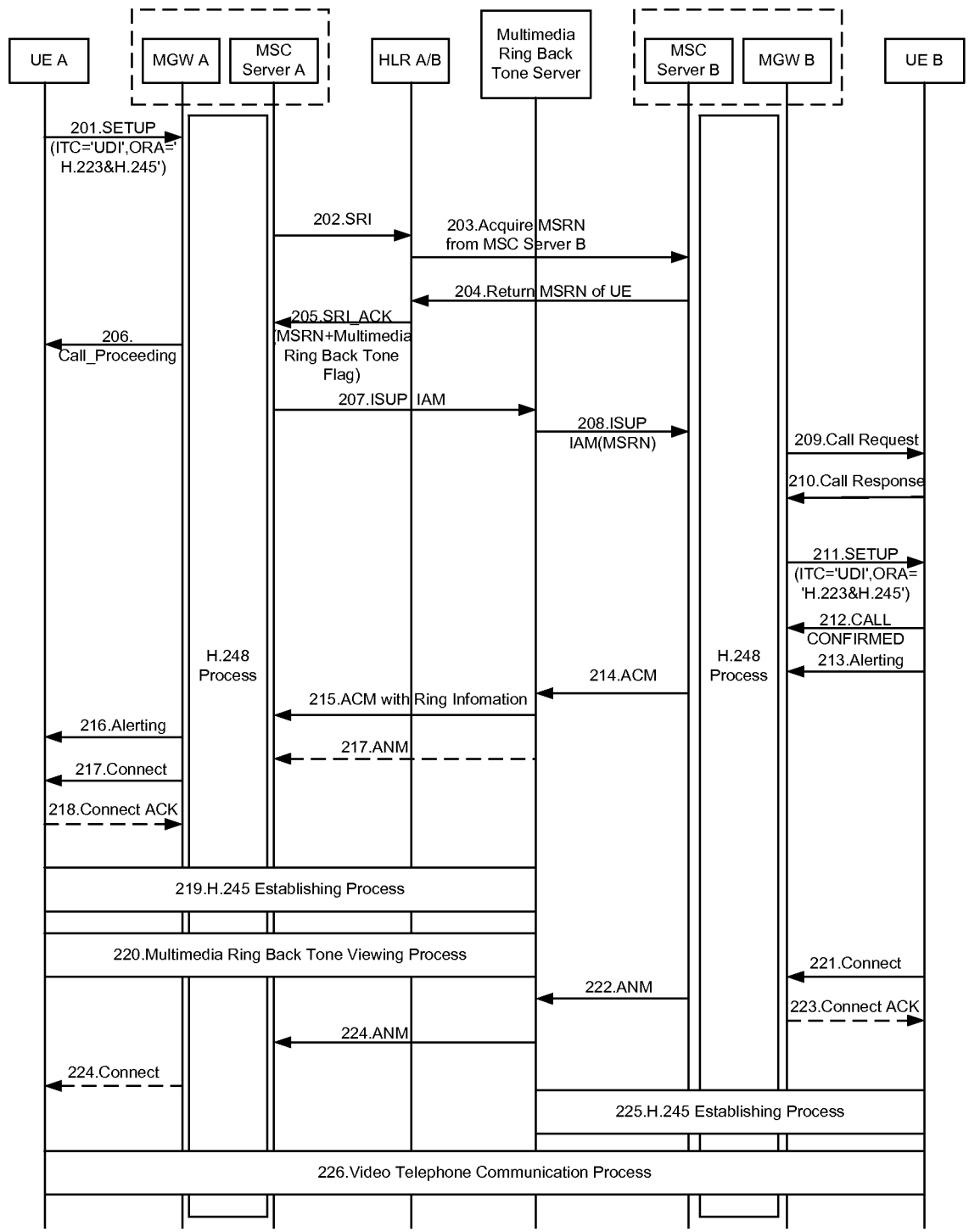
FIG. 2 is a signaling flowchart of a calling method for the video phone in accordance with a first embodiment of the present invention.

As shown in FIG. 1, the network structure of this embodiment includes a Mobile Switching Center (MSC) server, a Media Gateway (MGW), a Visitor Location Register (VLR), a Radio Network Controller (RNC), a Node Base Station (Node B), a Home Location Register (HLR), an Authentication Center (AuC), network elements such as a Multimedia Ring Back Tone server for providing Multimedia Ring Back Tones, as well as calling and called terminals. The MSC server and the VLR may be integrated together as a combined network element. The MSC server establishes a connection with the MGW by an H.248 process. The HLR and the AuC may be integrated together as a combined network element. (The AuC may not exist in a real networking situation.) As shown in FIG. 2, the specific flow includes the following steps.

In step 201, the calling terminal or the User Equipment (UE) A sends a SETUP message to the attached MSC server A, with the ITC in the BC_IE cell carried in this message being 'UDI', and the Other Rate Adaptation (ORA) being 'H.223&H.245'.

In step 202, the MSC server A issues a Send Routing Information (SRI) request to the HLR B of the called terminal or UE B, to inquire the routing information.

In step 203, the HLR B sends a Provide Roaming Number (PRN) message to an MSC server B attached to the UE B, to request the Mobile Station Roaming Number (MSRN) of the UE B.

In step 204, the MSC server B returns the MSRN of UE B to the HLR B. However, a pre-calling process is initiated before the MSRN of UE B is returned if the MSC server B supports pre-calling.

In step 205, the HLR B returns the routing information of UE B (i.e., the MSRN of UE B) to the MSC server A, carrying the information on whether the called user (the user of UE B) has customized the Multimedia Ring Back Tone service.

In step 206, the MSC server A initiates a Call_Proceeding process to the UE A upon obtaining the MSRN of UE B.

In step 207, the MSC server A issues an ISUP IAM message (Integrated Service Digital Network User Part Initial Address Message) to the Multimedia Ring Back Tone server. If the called user subscribes for the calling number display service, the ISUP IAM message may carry the calling number and the service prefix information. The Multimedia Ring Back Tone server is a system for providing Multimedia Ring Back Tones for the video phone users, having the abilities of storing, playing and managing the Multimedia Ring Back Tones, and supporting the Bearer Independent Call Control (BICC)/ISDN User Part (ISUP) protocol. If the called user applies for the Multimedia Ring Back Tone service, the server may provide the playback of the Multimedia Ring Back Tone for the calling terminal, and may terminate the playback of Multimedia Ring Back Tone automatically when the called user answers the call.

In step 208, the Multimedia Ring Back Tone server issues an ISUP IAM message to the MSC server B. If the called user subscribes for the calling number display service, the ISUP IAM message would carry the calling number.

In step 209, if the pre-calling process is not initiated before the MSC server B returns the MSRN of UE B to the HLR B, the MSC server B sends a calling request message to the UE B in this step.

In step 210, the UE B returns a calling response message to the MSC server B.

In step 211, the MSC server B sends a SETUP message to the UE B, with the ITC in the BC_IE cell carried in the message being 'UDI', and the ORA being 'H.223&H.245'.

In step 212, the UE B returns a CALL CONFIRMED message without carrying a new BC_IE to the MSC server B, indicating that the video phone calling is supported. Then, the UE B starts to ring.

In step 213, the UE B returns an Alerting message to the MSC server B after the UE B rings.

In step 214, the MSC server B sends an Address Complete Message (ACM) to the Multimedia Ring Back Tone server.

In step 215, the Multimedia Ring Back Tone server sends an AMC carrying Multimedia Ring Back Tone information to the MSC server A upon receiving the ACM sent from the MSC server B.

In step 216, the MSC server A identifies the Multimedia Ring Back Tone information and sends an Alerting to the UE A.

In step 217, the Multimedia Ring Back Tone server sends an Answer Message (ANM) to the MSC server A, triggering the MSC server A to send a Connect message to the UE A. The ANM message is an ANM signal sent from the Multimedia Ring Back Tone server to the MSC server A, indicating that a communication between the Multimedia Ring Back Tone server and the UE A may be established, and triggering the Connect message. In this embodiment, this step is optional and may be chosen particularly depending on the practical requirements. It should be noted that, the MSC server A may send the Connect message to the UE A upon receiving the AMC carrying Multimedia Ring Back Tone information from the Multimedia Ring Back Tone server. That is, the sending of the Connect message may not be triggered by the ANM message.

In step 218, the UE A sends a Connect ACK message to the MSC server A upon receiving the Connect message.

In step 219, a first bearer of the video phone is established between the UE A and the Multimedia Ring Back Tone server through a video phone signaling protocol process. The video phone signaling protocol may be a video phone signaling protocol of H.324, H.323, or Session Initiation Protocol (SIP). This embodiment is illustrated by an example of establishing the first bearer of the video phone through the H.245 process in H.323.

In step 220, the UE A views the video Multimedia Ring Back Tone via the Multimedia Ring Back Tone server.

In step 221, the UE B sends a Connect message to the MSC server B after the UE B finishes the act of picking up the phone. The called party answering process starts.

In step 222, the MSC server B sends an ANM message to the Multimedia Ring Back Tone server.

In step 223, the MSC server B sends a Connect_ACK message to the UE B.

In step 224, the Multimedia Ring Back Tone server sends an ANM message to the MSC server A, and then the MSC server A attached to the UE A starts to charge for the video phone communication. Since the video phone communication is charged upon detecting that the UE B answers the call, the communication duration may be calculated and controlled accurately in the implementing process of the Multimedia Ring Back Tone service. Then, the MSC server A may send Connect signaling to the UE A. It should be noted that, in the practical application, the MSC server A may not send the Connect signaling to the UE A, or the UE A may not process the Connect message although it is sent. In other words, it is an optional step to send the Connect message. If the UE A receives and decides to process the Connect message, the UE A may reply with a Connect_ACK message to the MSC server A, or without replying with any message.

In step 225, a second bearer of the video phone is established between the Multimedia Ring Back Tone server and the UE B through a multimedia communication control signaling protocol H.245 process.

In step 226, the video phone communication of the Third Generation (3G) circuit domain is conducted between the UE A and the UE B via the first bearer of the video phone established between the UE A and the Multimedia Ring Back Tone server, as well as the second bearer of the video phone established between the UE B and the Multimedia Ring Back Tone server.

It is apparent that in this embodiment, the Multimedia Ring Back Tone service may be achieved based on the prior network framework for the video phone. Moreover, by playing the Multimedia Ring Back Tone to the calling terminal by the Multimedia Ring Back Tone server, it avoids the reconstruction of the protocol layer for the terminals, thereby minimizing the effect on the terminals caused by implementing the Multimedia Ring Back Tone service of the video phone. In addition, the UE A and UE B each merely establish one video phone bearer with the Multimedia Ring Back Tone server, and the UE A and UE B complete the video phone through the Multimedia Ring Back Tone server. Further, this embodiment places little reconstruction onto both the MSC servers and the terminals, and thus is easy to implement.

It should be noted that, the Connect ACK messages in steps 218 and 223 in this embodiment are used to acknowledge the Connect messages, and may or may not exist depending on the practical requirements.

Figure 3:
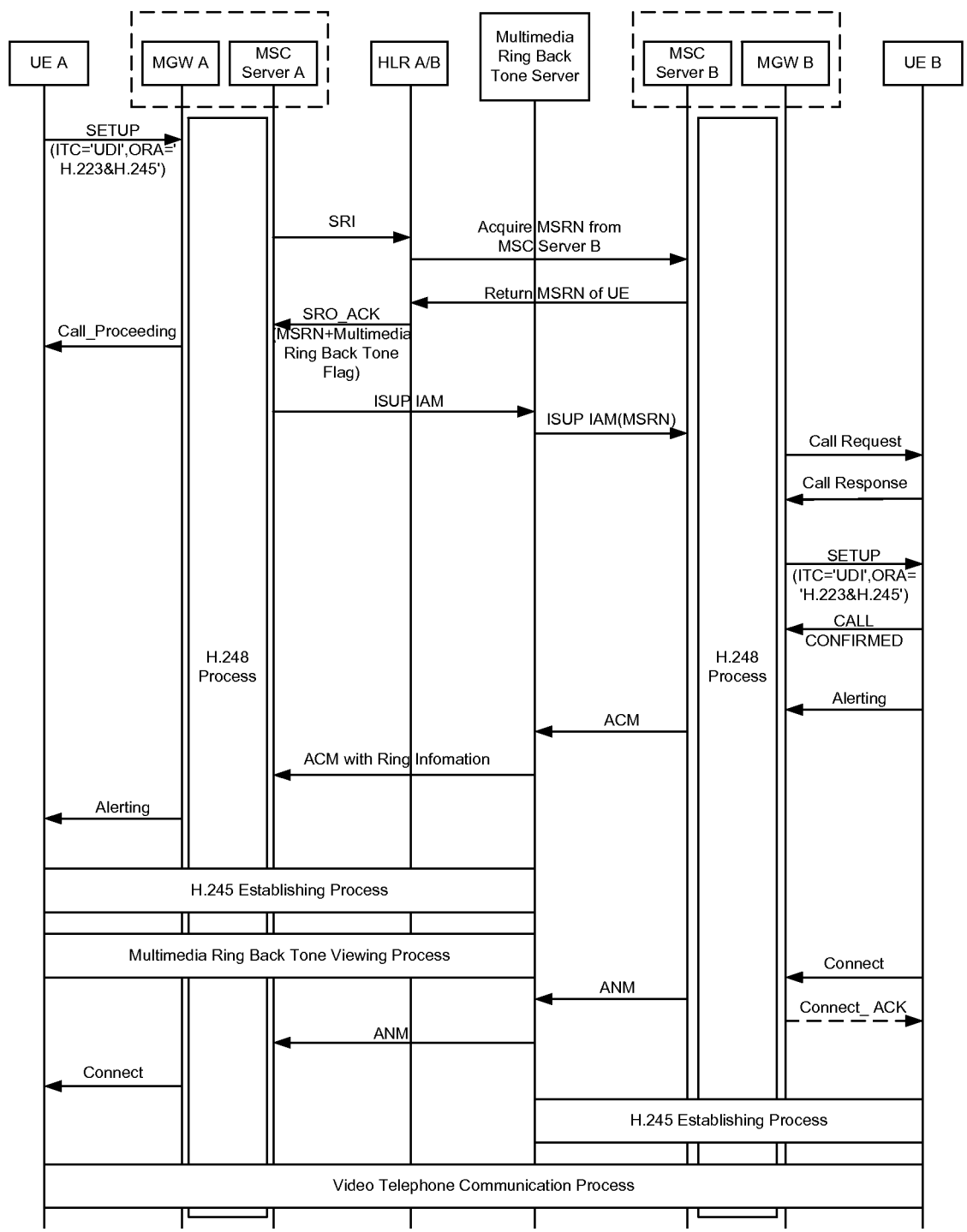
FIG. 3 is a signaling flowchart of a calling method for the video phone in accordance with a second embodiment of the present invention.

A second embodiment of the present invention relates to a calling method for a video phone, and is approximately similar to the first embodiment, except that the MSC server A notifies the UE A to establish the first bearer of a video phone by sending a Connect message to the UE A (as in step 217) in the first embodiment. While in this embodiment, instead of sending a Connect message as shown in step 217 to the UE A after sending the Alerting message to the UE A (as shown in FIG. 3), the MSC server A carries a service identifier in the Alerting message sent to the UE A. For example, a special text identifying the Multimedia Ring Back Tone service is carried by an information element "User-User" in the Alerting message, so that the UE A may identify whether to receive a Multimedia Ring Back Tone. The UE A starts the communication of the video phone according to a normal flow if the service identifier is not carried in the Alerting message; or establishes a first bearer of the video phone if the service identifier is carried in the Alerting message.

In addition, the MSC server A sends a Connect message to the UE A if the called terminal UE B answers the call and the MSC server A receives the ANM message from the Multimedia Ring Back Tone server (i.e., the step 224 in the first embodiment), as shown in FIG. 3.

By carrying a service identifier in the Alerting message, the normal continuation may not be affected if a terminal not supporting the Multimedia Ring Back Tone service receives the Alerting message, so as to be flexibly compatible with the terminals not supporting the Multimedia Ring Back Tone service. Furthermore, the UE A is required to initiate 3G-324M protocol interaction after receiving the Alerting message, and the network is required to establish a Circuit Switch Data (CSD) 64 circuit link at this time, for rapid proceeding of the subsequent flow.

A third embodiment of the present invention relates to a calling method for a video phone, and is approximately similar to the first embodiment, except that in the first embodiment, the network side is not required to notify the calling terminal (i.e., UE A) of the charging information for the video phone communication duration, while in this embodiment, before it detects that the called terminal (i.e., UE B) answers the call, the network side notifies the calling terminal to ignore the charging or timing by sending a "Facility" message to the called terminal indicating that the network side has not charged; and upon detection that the called terminal answers the call, the network side notifies the calling terminal to charge or time by sending a "Facility" message to the called terminal indicating that the network side starts to charge. For convenience of description, the first "Facility" message is referred to as "Facility" message FA, and the second "Facility" message is referred to as "Facility" message FB.

Figure 4:
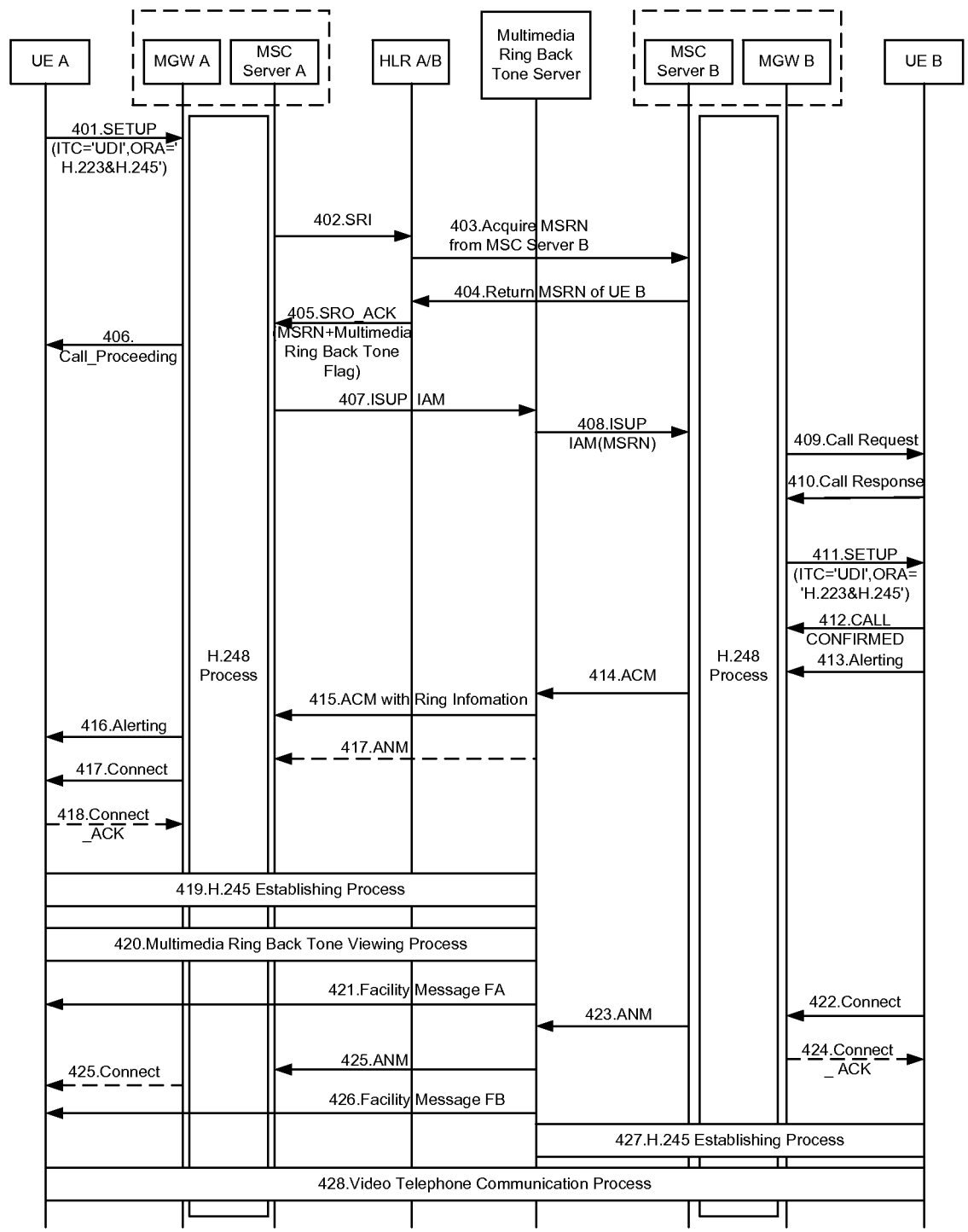
FIG. 4 is a signaling flowchart of a calling method for the video phone in accordance with a third embodiment of the present invention.

The specific flow is as shown in FIG. 4, wherein steps 401 to 420 are completely identical with steps 201 to 220, respectively, and will not be repeated here.

In step 421, the MSC server A or the Multimedia Ring Back Tone server sends a "Facility" message FA to the UE A, informing the UE A that this is not a normal communication and the network side has not started to charge yet.

Steps 422 to 425 are completely identical with steps 221 to 224, respectively, and will not be repeated here.

In step 426, the MSC server A or the Multimedia Ring Back Tone server sends a "Facility" message FB to the UE A, informing the UE A that the normal communication starts and the network side starts to charge.

Since during a normal process of the video phone, the UE A establishes a bearer of the video phone upon receiving the Connect message in step 417, then the UE A displays "in video phone communication" to the user, and normally, appends the duration of the video phone communication, such as "00:19", etc. While the Multimedia Ring Back Tone service is a service added based upon the video phone, if the UE is not reconstructed, the video phone application would deem the process the Multimedia Ring Back Tone service as a process of the video phone communication, and therefore displays "in video phone communication" and the corresponding timing information during the playback of the Multimedia Ring Back Tone.

In order to avoid the user misunderstanding the charging information, while reducing the modification to the video phone caused by the service as possible so as not to affect the normal video phone communication, the UE may time according to a normal situation after receiving the Connect message in step 417, and displays information to the user indicating that the network side has not started to charge yet after receiving the message indicating that the network side has not started to charge, i.e., the "Facility" message FA. For example, the displayed timing information may be cleared, and information such as "playing ring back tone without charging" may be displayed on the screen to inform the user that the network side has not started to charge yet. After the UE receives a message indicating that the network side starts to charge, i.e., the "Facility" message FB, the video phone application starts to time/charge for the video phone, and displays the text such as "in video phone", and the like.

Since the Connect message in step 417 is optional, when the UE does not receive the Connect message distributed from the system side and the function of the Connect message is replaced by other signaling messages, upon receiving the signaling replacing the function of the Connect message, the UE displays in terms of a Multimedia Ring Back Tone, i.e., displaying the text such as "playing ring back tone" and the like, without displaying the timing information or displaying as "00:00". Upon receiving the Connect message, all contents are displayed in terms of a normal video phone displaying process.

Steps 427 and 428 are completely identical with steps 225 and 226, respectively, and will not be repeated here.

It should be noted that, the Connect ACK messages in steps 418 and 424 in this embodiment may or may not exist depending on the practical requirements. In addition, the "Facility" message FA may be sent in step 421 shown in FIG. 4, or in any step after step 416 and prior to step 425.

In step 425 of this embodiment, the MSC server A may or may not send the Connect message to the UE A. If the MSC server A is to send the Connect message, it sends the Connect message to the UE A after receiving the ANM sent from the Multimedia Ring Back Tone server. The UE A may or may not process this message.

It is apparent that the major function of the steps 421 and 426 in this embodiment is to prompt the calling terminal whether a real the video phone has started, so that the calling terminal may accurately acquire the communication duration calculated on the network side, so as to avoid the user of the calling terminal misunderstanding the charging information, solving the problem regarding when the terminal would start to charge during the Multimedia Ring Back Tone is played.

It is worth to mention that in this embodiment, the MSC server A may further send information on whether the present ringing may trigger the playback of the Multimedia Ring Back Tone to the UE A via the Alerting message or the Connect message distributed to the UE A in step 416 or step 417, so that the UE A may time accurately according thereto. For example, if this information is not contained in the message, the UE A may initiate the timing in a normal way, while if this information is contained in the message, instead of initiating the timing upon receiving the first Connect message, the UE A waits for the network to send a subsequent message instructing to initiate the timing and initiates the timing upon receiving this message.

The information on whether the present ringing may trigger the playback of the Multimedia Ring Back Tone may be implemented by extending the facility field in the message, or the User-User field in the Connect message. For example, if the value of the User-User field in the Connect message is 1, it instructs the UE A not to time upon receiving the first Connect message; if the value of the User-User field in the Connect message is 0, it instructs the UE A to initiate the timing in a normal way.

It is apparent that if the information regarding whether the present ringing may trigger the playback of the Multimedia Ring Back Tone is carried in the Alerting message or the Connect message distributed to the UE A, it is equivalent that the step 421 is performed, and thus the sending of the "Facility" message FA may be omitted. However, the "Facility" message FB is still to be sent, which is the aforementioned message instructing to initiate the timing.

A fourth embodiment of the present invention relates to a calling method for a video phone, and is approximately similar to the first embodiment, except that in the first embodiment, the network side may not notify the calling terminal (i.e., UE A) of the charging information for the related video phone communication duration, while in this embodiment, before it detects that the called terminal (i.e., UE B) answers the call, the network side notifies the calling terminal to ignore the charging or timing by sending a Short Message Service (SMS) message to the called terminal indicating that the network side has not charged; and upon detecting that the called terminal answers the call, the network side notifies the calling terminal to charge or time by sending an SMS message to the called terminal indicating that the network side starts charging. For convenience of description, the first SMS message is referred to as SMS message SA, and the second SMS message is referred to as SMS message SB.

Figure 5:
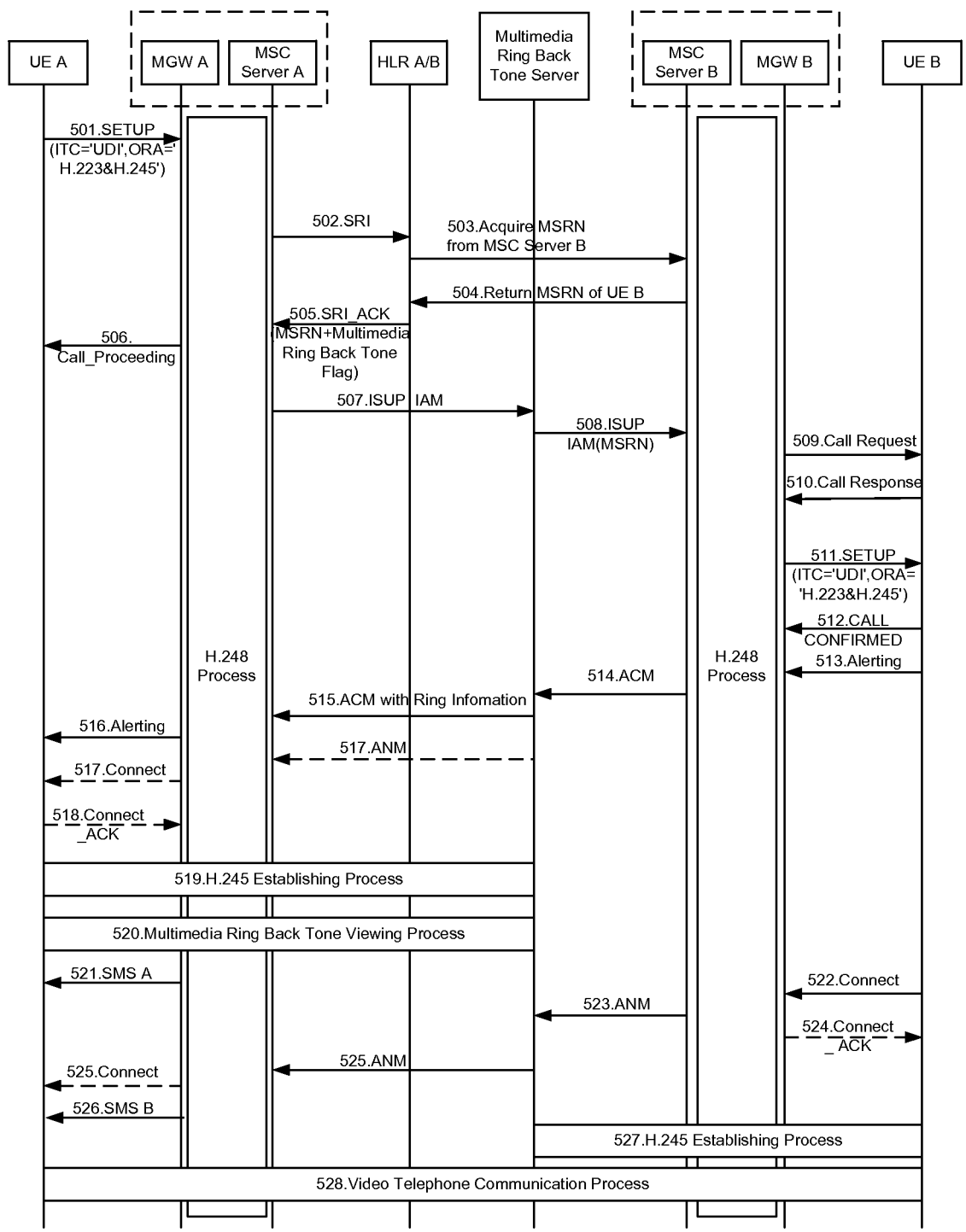
FIG. 5 is a signaling flowchart of a calling method for the video phone in accordance with a fourth embodiment of the present invention.

The specific flow is as shown in FIG. 5, wherein steps 501 to 520 are completely identical with steps 201 to 220, respectively, and will not be repeated here.

In step 521, the MSC server A sends an SMS message SA to the UE A, informing the UE A that this is not a normal communication and the network side has not started to charge yet. The UE A may display the information indicating that the network side has not started to charge yet to the user upon receiving the SMS message SA. For example, the information such as "playing ring back tone without charging" may be displayed on the screen to inform the user that the network side has not started to charge.

Steps 522 to 525 are completely identical with steps 221 to 224, respectively, and will not be repeated here.

In step 526, the MSC server A sends an SMS message SB to the UE A, informing the UE A that the normal communication starts and the network side starts to charge.

The sending of the SMS messages in steps 521 and 526 is essentially a logic process. In the practical implementation, the SMS may be sent by the MSC server A, or by the MSC server A in cooperation with a support device such as a short message gateway or the like. In this embodiment, the MSC server A sending the SMS means that the SMS message is triggered by some device and is sent via the MSC server A.

Steps 527 and 528 are completely identical with steps 225 and 226, respectively, and will not be repeated here.

It should be noted that, the Connect ACK messages in steps 518 and 524 in this embodiment may or may not exist depending on the practical requirements. In addition, the SMS message A may be sent in step 521 shown in FIG. 5, or in any step after step 516 and prior to step 525.

In step 525 of this embodiment, the MSC server A may or may not send the Connect message to the UE A. If the MSC server A is to send the Connect message, it sends the Connect message to the UE A after receiving the ANM sent from the Multimedia Ring Back Tone server. The UE A may or may not process this message.

It is apparent that the major function of the steps 521 and 526 in this embodiment is to prompt the calling terminal whether a real the video phone has started, so that the calling terminal may accurately acquire the communication duration calculated on the network side, so as to avoid the user of the calling terminal misunderstanding the charging information, thereby solving the problem regarding when the terminal would start to charge during the Multimedia Ring Back Tone is played. Since the SMS is a common communication manner for terminals, the information indicating whether the network side has started to charge may be represented by the content carried by the SMS. The corresponding information may be represented by carrying what content in the SMS may be defined in advance. For example, it may indicate that the video phone has not started yet and that it is the Multimedia Ring Back Tone service currently by utilizing the "MRBT Begin" carried by the SMS message. The calling terminal may consider the current session as a Multimedia Ring Back Tone session after receiving the SMS message, instead of processing the current session as a video phone communication. It may utilize the "VP Begin" carried by the SMS message as a flag for the video phone to start. The calling terminal may consider the current session as a video phone communication after receiving this SMS message, and process the current session as a normal video phone communication. Since the SMS message may carry different content and information, the information represented by the SMS message may be different, depending on the definition made in advance.

In addition, it is worth to mention that in this embodiment, it is illustrated by the example that the calling terminal is informed of whether the network side has started to charge by an SMS message, while in the practical applications, the calling terminal may be informed by other means, such as the Multimedia Message Services (MMS), the Electronic mail (E-mail), the Instant Messenger (IM), the Push Message, etc. The specific implementing manner is similar to that of this embodiment, and will not be repeated here.

It should be noted that in this embodiment, the MSC server A may further send information regarding whether the present ringing may trigger the playback of the Multimedia Ring Back Tone to the UE A via the Alerting message or the Connect message distributed to the UE A in step 516 or step 517, so that the UE A may time accurately according thereto. For example, if this information is not contained in the message, the UE A may initiate the timing in a normal manner, while if this information is contained in the message, instead of initiating the timing upon receiving the first Connect message, the UE A waits for the network to send a subsequent message instructing to initiate the timing and initiates the timing upon receiving this message.

The information regarding whether the present ringing may trigger the playback of the Multimedia Ring Back Tone may be implemented by extending the facility field in the message, or the User-User field in the Connect message. For example, if the value of the User-User field in the Connect message is 1, it instructs the UE A not to time upon receiving the first Connect message; if the value of the User-User field in the Connect message is 0, it instructs the UE A to initiate the timing in a normal way.

It is apparent that if the information regarding whether the present ringing may trigger the playback of the Multimedia Ring Back Tone is carried in the Alerting message or the Connect message distributed to the UE A, it is equivalent that the step 521 is performed, and the sending of the SMS message A may be omitted. However, the SMS message SB is still to be sent, which is the aforementioned message instructing to initiate the timing.

A fifth embodiment of the present invention relates to a calling method for a video phone, and is approximately similar to the first embodiment, except that in the first embodiment, the network side may not notify the calling terminal (i.e., UE A) of the charging information for the related video phone communication duration, while in this embodiment, before it detects that the called terminal (i.e., UE B) answers the call, the network side notifies the calling terminal to ignore the charging or timing by sending a Command or Indication message of H.245 to the called terminal indicating that the network side has not started to charge; and upon detecting that the called terminal answers the call, the network side notifies the calling terminal to charge or time by sending a Command or Indication message of H.245 to the called terminal indicating that the network side starts to charge. For convenience of description, the first Command or Indication message of H.245 is referred to as Command or Indication message A of H.245 and the second Command or Indication message of H.245 is referred to as Command or Indication message HB of H.245 hereinafter.

Figure 6:
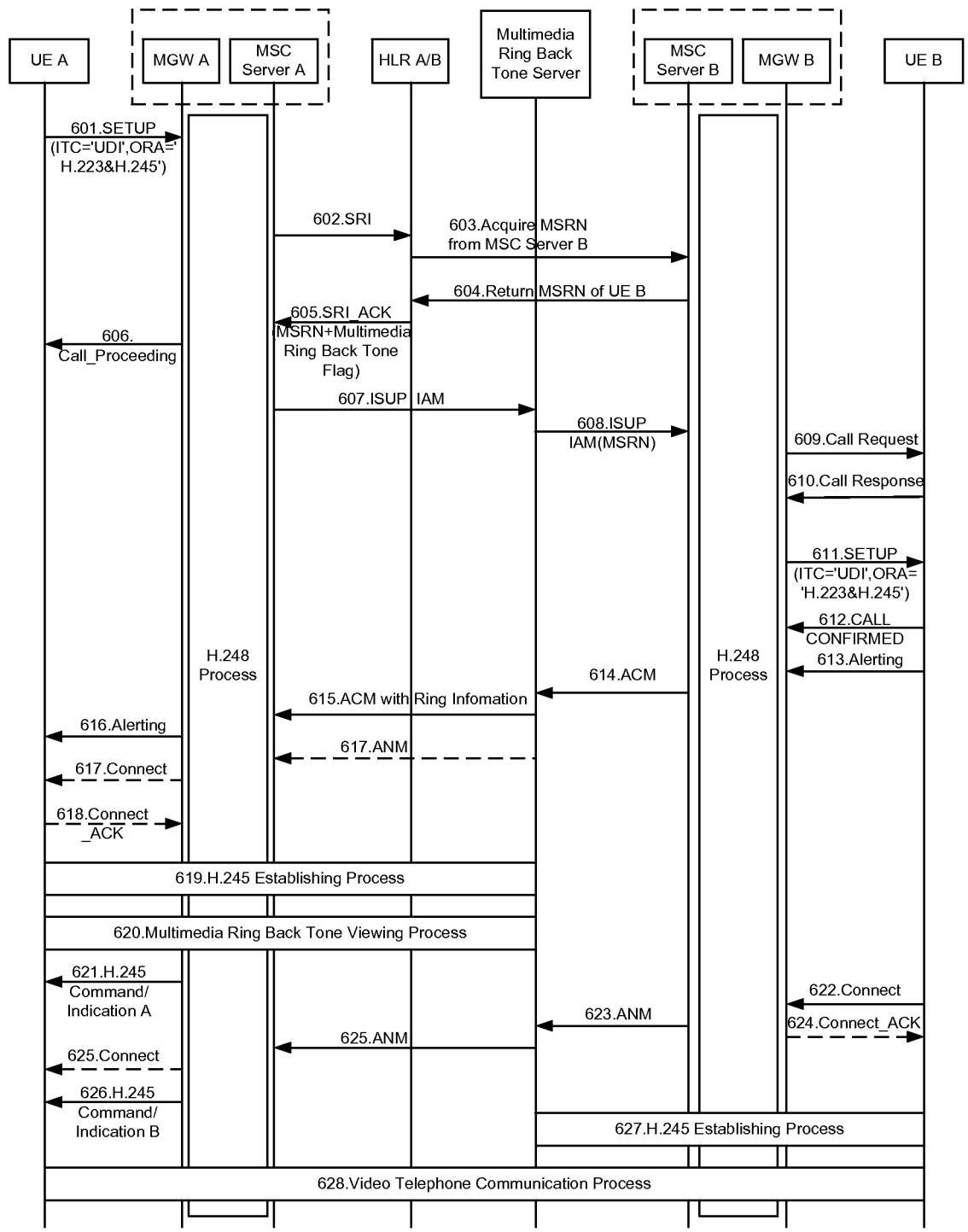
FIG. 6 is a signaling flowchart of a calling method for the video phone in accordance with a fifth embodiment of the present invention.

The specific flow is as shown in FIG. 6, wherein steps 601 to 620 are completely identical with steps 201 to 220, respectively, and will not be repeated here.

In step 621, the Multimedia Ring Back Tone server sends a Command or Indication message A of H.245 to the UE A, informing the UE A that this is not a normal communication and the network side has not started to charge yet. The UE A may display the information indicating that the network side has not started to charge yet to the user upon receiving the Command or Indication message HA of H.245. For example, the information such as "playing ring back tone without charging" may be displayed on the screen to inform the user that the network side has not started to charge yet.

Steps 622 to 625 are completely identical with steps 221 to 224, respectively, and will not be repeated here.

In step 626, the Multimedia Ring Back Tone server sends a Command or Indication message HB of H.245 to the UE A, informing the UE A that a normal communication starts and the network side starts to charge.

Steps 627 and 628 are completely identical with steps 225 and 226, respectively, and will not be repeated here.

It should be noted that, the Connect ACK messages in steps 618 and 624 in this embodiment may or may not exist depending on the practical requirements. In addition, the Command or Indication message HA of H.245 may be sent in step 621 shown in FIG. 6, or in any step after step 619 and prior to step 625.

In step 625 of this embodiment, the MSC server A may or may not send the Connect message to the UE A. If the MSC server A is to send the Connect message, it sends the Connect message to the UE A after receiving the ANM sent from the Multimedia Ring Back Tone server. The UE A may or may not process this message.

It is apparent that the major function of the steps 621 and 626 in this embodiment is to prompt the calling terminal whether a real the video phone has started, so that the calling terminal may accurately acquire the communication duration calculated on the network side, so as to avoid the user of the calling terminal misunderstanding the charging information, thereby solving the problem regarding when the terminal would start to charge during the Multimedia Ring Back Tone is played. Since the whole developing process of Multimedia Ring Back Tone requires the support of H.245, the information indicating whether the network side has started to charge may be represented by the Command or Indication messages of H.245. The corresponding information may be represented by what Command or Indication message of H.245 is defined in advance, for example, if the Indication message of USER INPUT in H.245 employs the format of

```
Indication Message : user input
UserInputIndication ::=CHOICE
{
nonStandard NonStandardParameter,
alphanumeric GeneralString,
...
}
``` then it may indicate that the video phone has not started yet and that it is the Multimedia Ring Back Tone service currently by carrying 10000 with the "GeneralString" field in the Indication message of USER INPUT. Upon receiving this message, the calling terminal may consider the current session as a Multimedia Ring Back Tone session, instead of processing the current session as a video phone call. On the other hand, it may indicate that Multimedia Ring Back Tone service ends and that the video phone starts by carrying 10001 with the "GeneralString" field in the Indication message of USER INPUT. Upon receiving this message, the calling terminal may consider the current session as a video phone communication, and process the current session as a normal video phone communication. Since the Indication message of USER INPUT may carry a variety of data, the foregoing scheme is only a possible way and values.

Take the H.245 Command message as an example, the H.245 Command message A may further transmit a Dual-tone multi-frequency (DTMF) A signal by a USER INPUT Indication (UII), indicating the UE A to stop the timing of the terminal Upon receiving this message, the UE A stops timing, clears the timer, and prompts the user that a Multimedia Ring Back Tone is to be played. An H.245 Command message b may instruct the UE A to start timing by transmitting a DTMF B signal. Upon receiving this message, the UE A starts timing, and prompts the user to start the normal communication.

Other commands and indications of H.245 or other messages may be employed in a specific implementing process. The specific implementing manner is similar to that of the present embodiment, and will not be repeated here.

It should be noted that in this embodiment, the MSC server A may further send information on whether the present ringing may trigger the playback of the Multimedia Ring Back Tone to the UE A via the Alerting message or the Connect message distributed to the UE A in step 616 or step 617, so that the UE A may time accurately according thereto. For example, if this information is not contained in the message, the UE A initiates the timing in a normal manner, while if this information is contained in the message, instead of initiating the timing upon receiving the first Connect message, the UE A waits for the network to send a subsequent message instructing to initiate the timing and initiates the timing upon receiving this message.

The information on whether the present ringing may trigger the playback of the Multimedia Ring Back Tone may be implemented by extending the facility field in the message, or the User-User field in the Connect message. For example, if the value of the User-User field in the Connect message is 1, it instructs the UE A not to time upon receiving the first Connect message; if the value of the User-User field in the Connect message is 0, it instructs the UE A to initiate the timing in a normal way.

It is apparent that if the information regarding whether the present ringing may trigger the playback of the Multimedia Ring Back Tone is carried in the Alerting message or the Connect message distributed to the UE A, it is equivalent that the step 621 is performed, and the sending of the Command or Indication message HA of H.245 may be omitted. However, the Command or Indication message HB of H.245 is still to be sent, which is the aforementioned message instructing to initiate the timing.

A sixth embodiment of the present invention relates to a calling method for a video phone, and is approximately similar to the first embodiment, except that in the first embodiment, the network side is may not notify the calling terminal (i.e., UE A) of the charging information for the related video phone communication duration, while in this embodiment, before it detects that the called terminal (i.e., UE B) answers the call, the network side notifies the calling terminal to ignore the charging or timing by sending a Unstructured Supplementary Service Data (USSD) signal to the called terminal indicating that the network side has not started to charge yet; and upon detecting that the called terminal answers the call, the network side notifies the calling terminal to charge or time by sending a USSD signal to the called terminal indicating that the network side starts charging. For convenience of description, the first USSD signal is referred to as USSD signal A, and the second USSD signal is referred to as USSD signal B.

Figure 7:
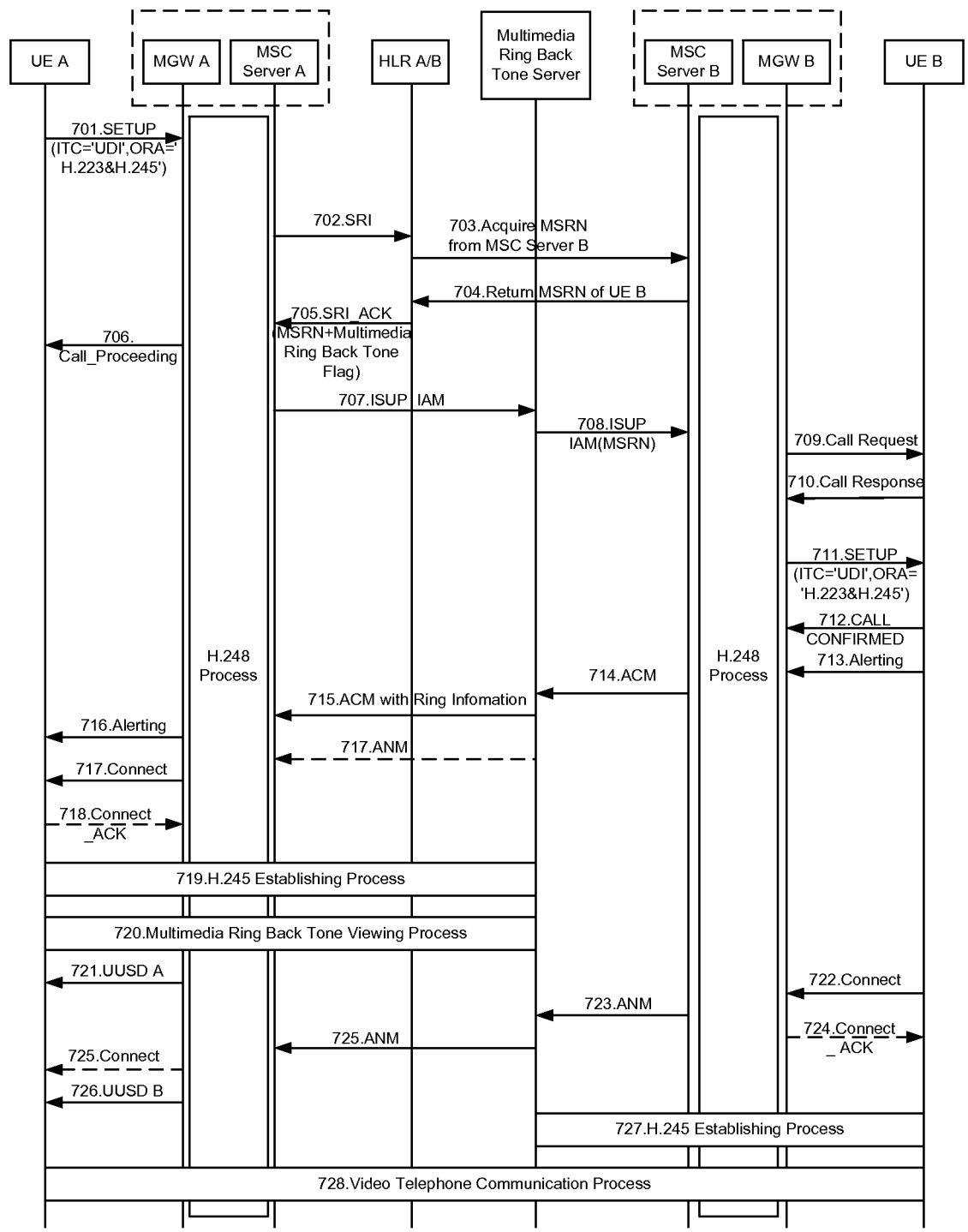
FIG. 7 is a signaling flowchart of a calling method for the video phone in accordance with a sixth embodiment of the present invention.

The specific flow is as shown in FIG. 7, wherein steps 701 to 720 are completely identical with steps 201 to 220, respectively, and will not be repeated here.

In step 721, the MSC server A sends a USSD signal A to the UE A, informing the UE A that this is not a normal communication and the network side has not started to charge yet. The UE A may display the information indicating that the network side has not started to charge yet to the user upon receiving the USSD signal A. For example, the information such as "playing ring back tone without charging" may be displayed on the screen to inform the user that the network side has not started to charge yet.

Steps 722 to 725 are completely identical with steps 221 to 224, respectively, and will not be repeated here.

In step 726, the MSC server A sends a USSD signal B to the UE A, informing the UE A that the normal call starts and that the network side starts to charge.

Steps 727 and 728 are completely identical with steps 225 and 226, respectively, and will not be repeated here.

It should be noted that, the Connect ACK messages in steps 718 and 724 in this embodiment may or may not exist depending on the practical requirements. In addition, the USSD signal A may be sent in step 721 shown in FIG. 7, or in any step after step 716 and prior to step 725.

In step 725 of this embodiment, the MSC server A may or may not send the Connect message to the UE A. If the MSC server A is to send the Connect message, it sends the Connect message to the UE A after receiving the ANM sent from the Multimedia Ring Back Tone server. The UE A may or may not process this message.

It is apparent that the major function of the steps 721 and 726 in this embodiment is to prompt the calling terminal whether the video phone has actually started, so that the calling terminal may accurately acquire the communication duration calculated on the network side, so as to avoid the user of the calling terminal misunderstanding the charging information, thereby solving the problem regarding when the terminal would start to charge during the Multimedia Ring Back Tone is played. Since the USSD is a common communication manner for terminals, the information indicating whether the network side has started to charge may be carried by the USSD signal. The corresponding information may be represented by carrying what USSD signal is defined in advance. For example, it may indicate to the calling terminal that it is the Multimedia Ring Back Tone service currently by a flag indicating that the Multimedia Ring Back Tone starts carried in the USSD signal. Upon receiving this USSD signal, the calling terminal may consider the current session as a Multimedia Ring Back Tone session, instead of processing the current session as a video phone communication. On the other hand, it may indicate to the calling terminal that the video phone starts by a flag, carried in the USSD signal, indicating that the video phone starts. Upon receiving this USSD signal, the calling terminal may consider the current session as a video phone communication, and process the current session as a normal video phone communication. Different USSD signals may represent different information, depending on the definition in advance.

In addition, it is worth to mention that in this embodiment, it is illustrated by the example that the calling terminal is informed of whether the network side has started to charge by a USSD signal. In the practical applications, the calling terminal may be informed by other means, such as the Session Initiation Protocol (SIP), the Hyper Text Transfer Protocol (HTTP), the Real-time Streaming Protocol (RTSP) signaling, etc. The specific implementing manner is similar to that of the present embodiment except the underlying link, and will not be repeated here.

It should be noted that in this embodiment, the MSC server A may further send information regarding whether the present ringing may trigger the playback of the Multimedia Ring Back Tone to the UE A via the Alerting message or the Connect message distributed to the UE A in step 716 or step 717, so that the UE A may time accurately according thereto. For example, if this information is not contained in the message, the UE A may initiate the timing in a normal manner, while if this information is contained in the message, instead of initiating the timing upon receiving the first Connect message, the UE A waits for the network to send a subsequent message instructing to initiate the timing and initiates the timing upon receiving this message.

The information regarding whether the present ringing may trigger the playback of the Multimedia Ring Back Tone may be implemented by extending the facility field in the message, or implemented by extending the User-User field in the Connect message. For example, if the value of the User-User field in the Connect message is 1, it instructs the UE A not to time upon receiving the first Connect message; if the value of the User-User field in the Connect message is 0, it instructs the UE A to initiate the timing in a normal way.

It is apparent that if the information regarding whether the present ringing may trigger the playback of the Multimedia Ring Back Tone is carried in the Alerting message or the Connect message distributed to the UE A, it is equivalent that the step 721 is performed, and the sending of the USSD signal A may be omitted. However, the USSD signal B is still to be sent, which is the forgoing message instructing to initiate the timing.

A seventh embodiment of the present invention relates to a calling method for a video phone. In this embodiment, a Multimedia Ring Back Tone server plays a Multimedia Ring Back Tone for the calling terminal via a third bearer of the video phone established between the calling terminal and the Multimedia Ring Back Tone server. A fourth bearer of the video phone is established between the calling terminal and the called terminal, and the video phone communication is performed between the calling terminal and the called terminal via the fourth bearer. The third and fourth bearers are video phone communication links established by the video phone protocol of H.324, H.323, or SIP, wherein the present embodiment is illustrated by an example of establishing the third and fourth bearers with an H.245 process in H.323.

Figure 8:
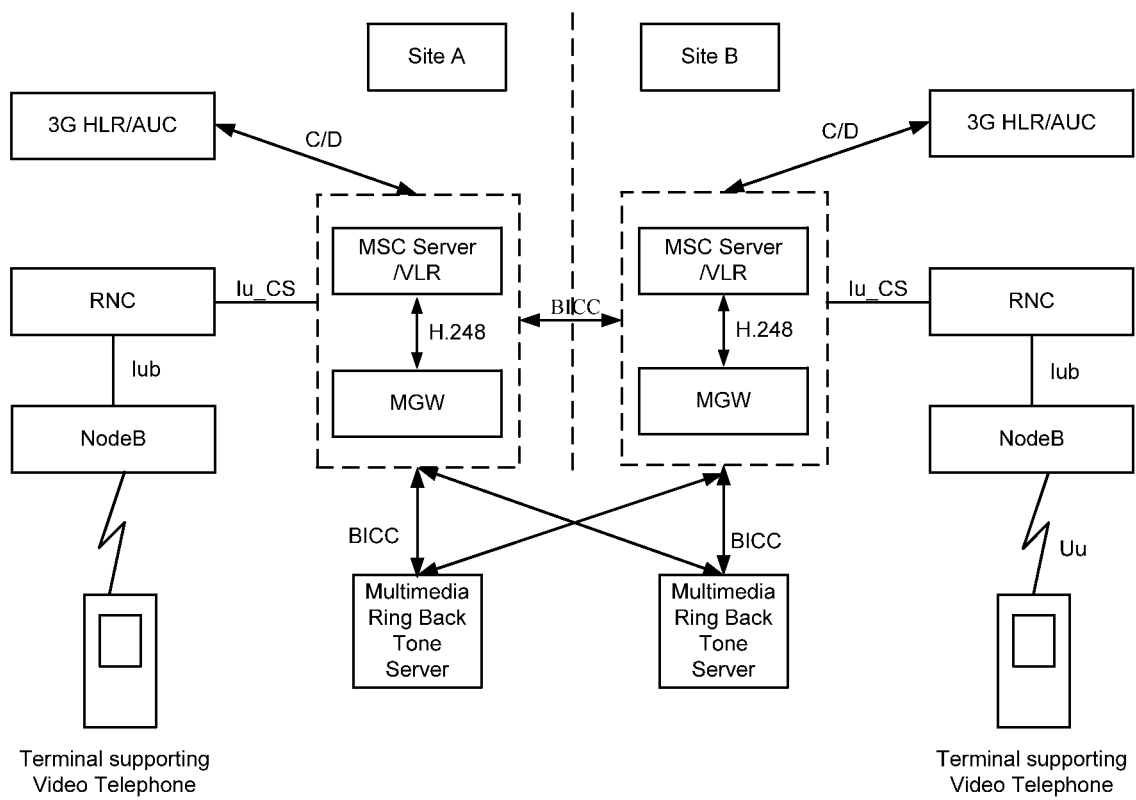
FIG. 8 is a structural diagram of a calling system for the video phone in accordance with a seventh embodiment of the present invention.
Figure 9:
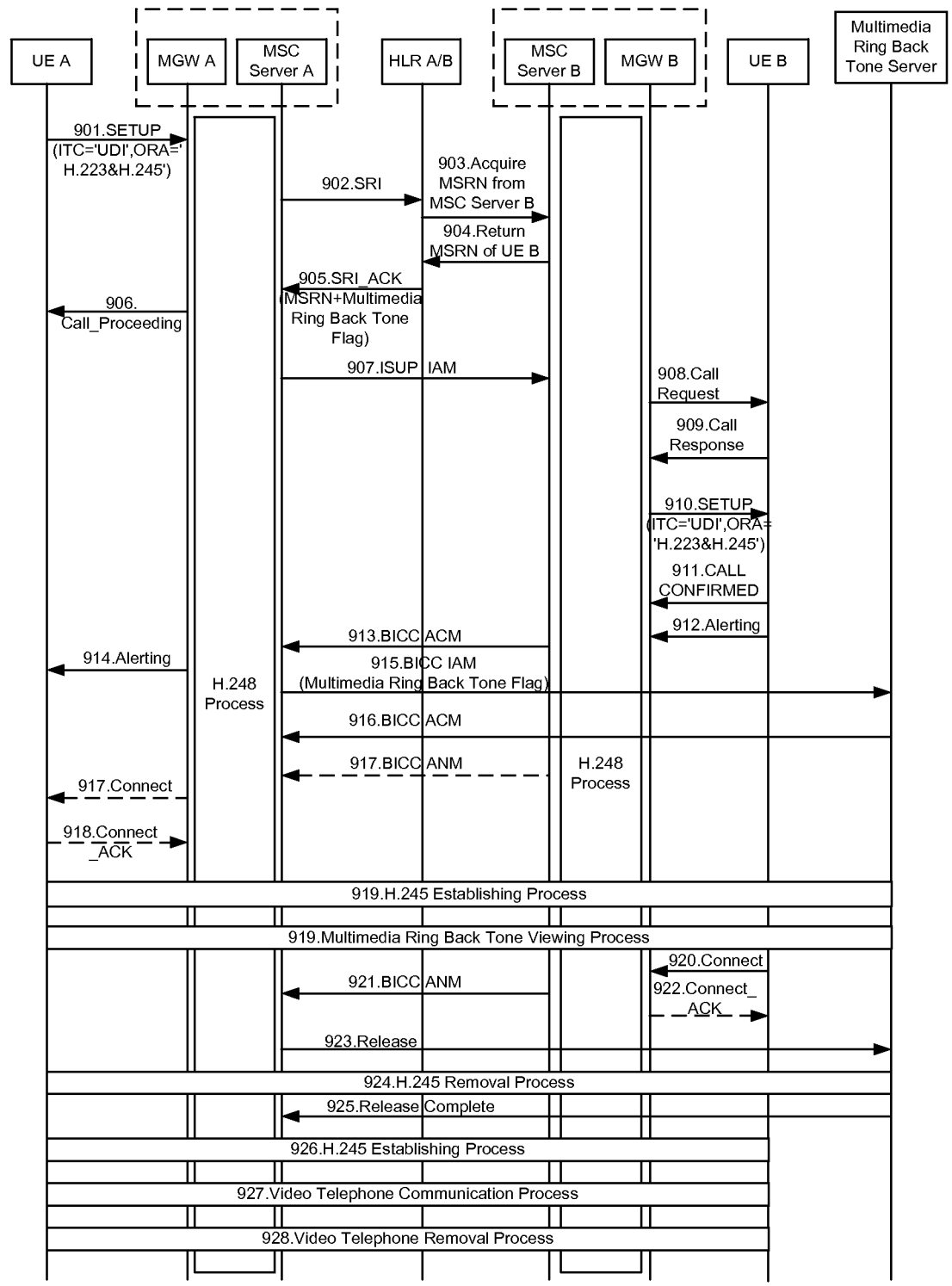
FIG. 9 is a signaling flowchart of a calling method for the video phone in accordance with the seventh embodiment of the present invention.

The network structure of this embodiment is shown in FIG. 8, with different Multimedia Ring Back Tone servers being established in different regions, wherein the MSC server and the VLR are still integrated together as a combined network element, the MSC server still establishes a connection with the MGW by an H.248 process, and the HLR and the AuC are still integrated together as a combined network element. The specific flow is shown in FIG. 9.

Step 901, the calling terminal or UE A sends a SETUP message to the attached MSC server A, with the ITC in the BC_IE cell carried in the message being 'UDI', and the ORA being 'H.223&H.245'.

In step 902, the MSC server A issues an SRI request to the HLR B of the called terminal, i.e., UE B.

In step 903, the HLR B acquires the Mobile Station Roaming Number (MSRN) of the UE B from the MSC server B attached to the UE B.

In step 904, the MSC server B returns the MSRN of UE B to the HLR B. However, a pre-calling process is initiated before the MSRN of UE B is returned if the MSC server B supports pre-calling.

In step 905, the HLR B returns the routing information of UE B (i.e., the MSRN of UE B) to the MSC server A, carrying the information on whether the called user (the user of UE B) has customized the Multimedia Ring Back Tone service.

In step 906, the MSC server A initiates a Call_Proceeding process to the UE A after obtaining the MSRN of UE B.

In step 907, the MSC server A issues an ISUP IAM message to the MSC server B. If the called user subscribes for the calling number display service, the ISUP IAM message would carry the calling number.

In step 908, if the pre-calling process is not initiated before the MSC server B returns the MSRN of UE B to the HLR B, the MSC server B sends a calling request message to the UE B in this step.

In step 909, the UE B returns a calling response message to the MSC server B.

In step 910, the MSC server B sends a SETUP message to the UE B, with the ITC in the BC_IE cell carried in the message being 'UDI', and the ORA being 'H.223&H.245'.

In step 911, the UE B returns a CALL CONFIRMED message without carrying a new BC_IE to the MSC server B, indicating that the video phone calling is supported.

In step 912, the UE B returns an Alerting message to the MSC server B after the UE B rings.

In step 913, the MSC server B returns a BICC ACM message to the MSC server A.

In step 914, the MSC server A returns an Alerting message to the MSC server B.

In step 915, the MSC server A issues a BICC IAM message to the Multimedia Ring Back Tone server, carrying the information on whether the UE B has customized Multimedia Ring Back Tone service.

In step 916, the Multimedia Ring Back Tone server returns a BICC ACM message to the MSC server A. The MSC server A identifies the ACM message sent from the Multimedia Ring Back Tone server, and does not send an Alerting message to the calling terminal.

In step 917, the Multimedia Ring Back Tone server sends a BICC ANM message to the MSC server A. After receiving the BICC ANM message, the MSC server A sends connecting signaling CONNECT to the calling terminal UE A, while listening whether a message is returned from the MSC server B. This ANM message represents that a communication between the Multimedia Ring Back Tone server and the UE A may be established, and is used to trigger the Connect message. In this embodiment, this step is an optional step and may be chosen particularly depending on the practical requirements.

In step 918, the UE A sends a Connect ACK message to the MSC server A upon receiving the Connect message.

In step 919, the UE A and the Multimedia Ring Back Tone server establish a third bearer of the video phone through a multimedia communication control signaling protocol H.245 process. After the establishment of the third bearer of the video phone is completed, the Multimedia Ring Back Tone information played by the Multimedia Ring Back Tone server may be viewed.

In step 920, the called terminal UE B sends a response message CONNECT to the MSC server B.

In step 921, the MSC server B returns a BICC ANM message to the MSC server A.

In Step 922, the MSC server B returns a Connect ACK message to the UE B.

In step 923, the MSC server A sends a BICC Release message to the Multimedia Ring Back Tone server, instructing to remove the third bearer established between the Multimedia Ring Back Tone server and the UE A.

In step 924, the third bearer of the video phone established between the Multimedia Ring Back Tone server and the UE A is removed.

In step 925, the Multimedia Ring Back Tone server returns a BICC Release Complete message to the MSC server A.

In step 926, the UE A and the UE B establish a fourth bearer of the video phone through a multimedia communication control signaling protocol H.245 process.

In step 927, the video phone communication in the 3G circuit domain is performed between the UE A and UE B via the fourth bearer of the video phone established between the UE A and UE B.

In step 928, after the video phone call finishes, the fourth bearer and the underlying circuits established between the UE A and UE B are removed.

It is apparent that in this embodiment, the Multimedia Ring Back Tone service may be achieved based on the prior network framework for a video phone. Moreover, by playing the Multimedia Ring Back Tone to the calling terminal by the Multimedia Ring Back Tone server, it avoids the reconstruction of the protocol layer for the terminals, thereby minimizing the effect on the terminals caused by implementing the Multimedia Ring Back Tone service of the video phone.

Furthermore, before establishing the fourth bearer of the video phone, the third bearer established between the calling terminal and the Multimedia Ring Back Tone server is to be removed upon detecting that the called terminal answers the call, so that the circuits occupied by the Multimedia Ring Back Tone server may be released immediately when the user communication is connected, thereby saving the limited circuit resources.

It is worth to mention that in this embodiment, after the establishment of the fourth bearer between the calling terminal and the called terminal is completed, the network side charges for the video phone communication, so that the communication duration may be calculated and controlled accurately in the implementing process of the Multimedia Ring Back Tone service.

It should be noted that in this embodiment, the MSC server A may further send information regarding whether the present ringing may trigger the playback of the Multimedia Ring Back Tone to the UE A via the Alerting message or the Connect message distributed to the UE A in step 914 or step 917, so that the UE A may time accurately according thereto. For example, if this information is not contained in the message, the UE A may initiate the timing in a normal manner, while if this information is contained in the message, instead of initiating the timing upon receiving the first Connect message, the UE A waits for the network to send a subsequent message instructing to initiate the timing and initiates the timing upon receiving this message.

The information on whether the present ringing may trigger the playback of the Multimedia Ring Back Tone may be implemented by extending the facility field in the message, or the User-User field in the Connect message. For example, if the value of the User-User field in the Connect message is 1, it instructs the UE A not to time upon receiving the first Connect message; if the value of the User-User field in the Connect message is 0, it instructs the UE A to initiate the timing in a normal way.

An eighth embodiment of the present invention relates to a calling method for a video phone, and is approximately similar to the seventh embodiment except that in the seventh embodiment, the third and forth bearers are video phone communication links established through the video phone protocol of H.324, H.323, or SIP, while in this embodiment, the third and forth bearers are CSD links, and the logic channels of the video phone are established on the CSD links through the video phone protocol of H.324, H.323, or SIP. The third bearer may be decomposed into: a fifth bearer from the calling terminal to the MSC server of the calling terminal, and a sixth bearer from the MSC server of the calling terminal to the Multimedia Ring Back Tone server; the fourth bearer may be decomposed into: the fifth bearer from the calling terminal to the MSC server of the calling terminal, and a seventh bearer from the MSC server of the calling terminal to the called terminal.

Figure 10:
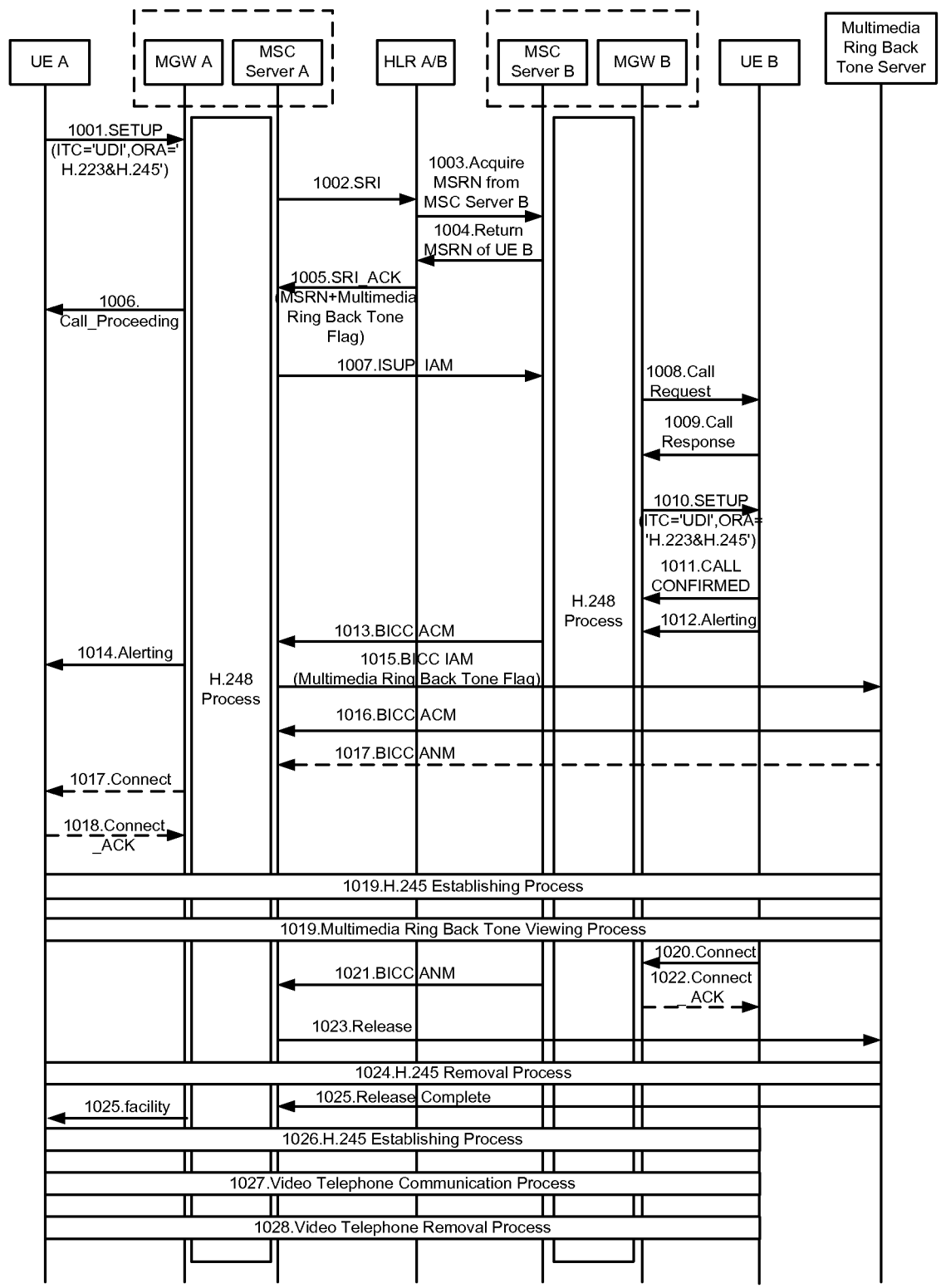
FIG. 10 is a signaling flowchart of a calling method for the video phone in accordance with an eighth embodiment of the present invention.

The specific flow is as shown in FIG. 10, wherein steps 1001 to 1018 are completely identical with steps 901 to 918, respectively, and will not be repeated here.

In step 1019, the fifth bearer is established between the UE A and the MSC server A, and the sixth bearer is established between the MSC server A and the Multimedia Ring Back Tone server. Both the fifth and sixth bearers are CSD links. Then, an H.245 process is established based on the fifth and sixth bearers. After the establishment, the user of the calling terminal may view the Multimedia Ring Back Tone played by the Multimedia Ring Back Tone server.

Steps 1020 to 1024 are completely identical with steps 920 to 924, respectively, and will not be repeated here.

In step 1025, the Multimedia Ring Back Tone server returns a BICC Release Complete message to the MSC server A. The MSC server A sends a Facility message to the UE A, indicating that the bearer between the MSC server A and the Multimedia Ring Back Tone server (i.e., the sixth bearer) has been removed, and that a CS64 kbps bearer link between the MSC server A and the MSC server B has been established. Apparently, it is merely a specific implementing manner to carry this information by the facility message, and other message may be used instead in practice. The major purpose of this step is to prompt the calling terminal or the UE A that the establishment of two H.245 bearer processes may be involved during the whole calling process of the video phone, and instructs the UE A to prepare for the second H.245 bearer process upon receiving the facility message, i.e., preparing for the establishment of a bearer with the UE B based on the existing CS64 kbp link.

This step may be at the location shown in FIG. 10, or at any location between the steps 1023 and 1026, with the major function being to prompt the establishment of the two H.245 bearer processes.

In step 1026, an H.245 process is established based on the existing fifth bearer between the UE A and the MSC server A, as well as the seventh bearer between the MSC server A and the UE B, i.e., establishing the fourth bearer between the calling terminal UE A and the called terminal UE B.

Steps 1027 and 1028 are completely identical with steps 927 and 928, respectively, and will not be repeated here.

It is apparent that as compared with the seventh embodiment, the present embodiment may provide a faster establishing process of the two H.245 bearer processes, with little modification and no implementing barrier.

Figure 11:
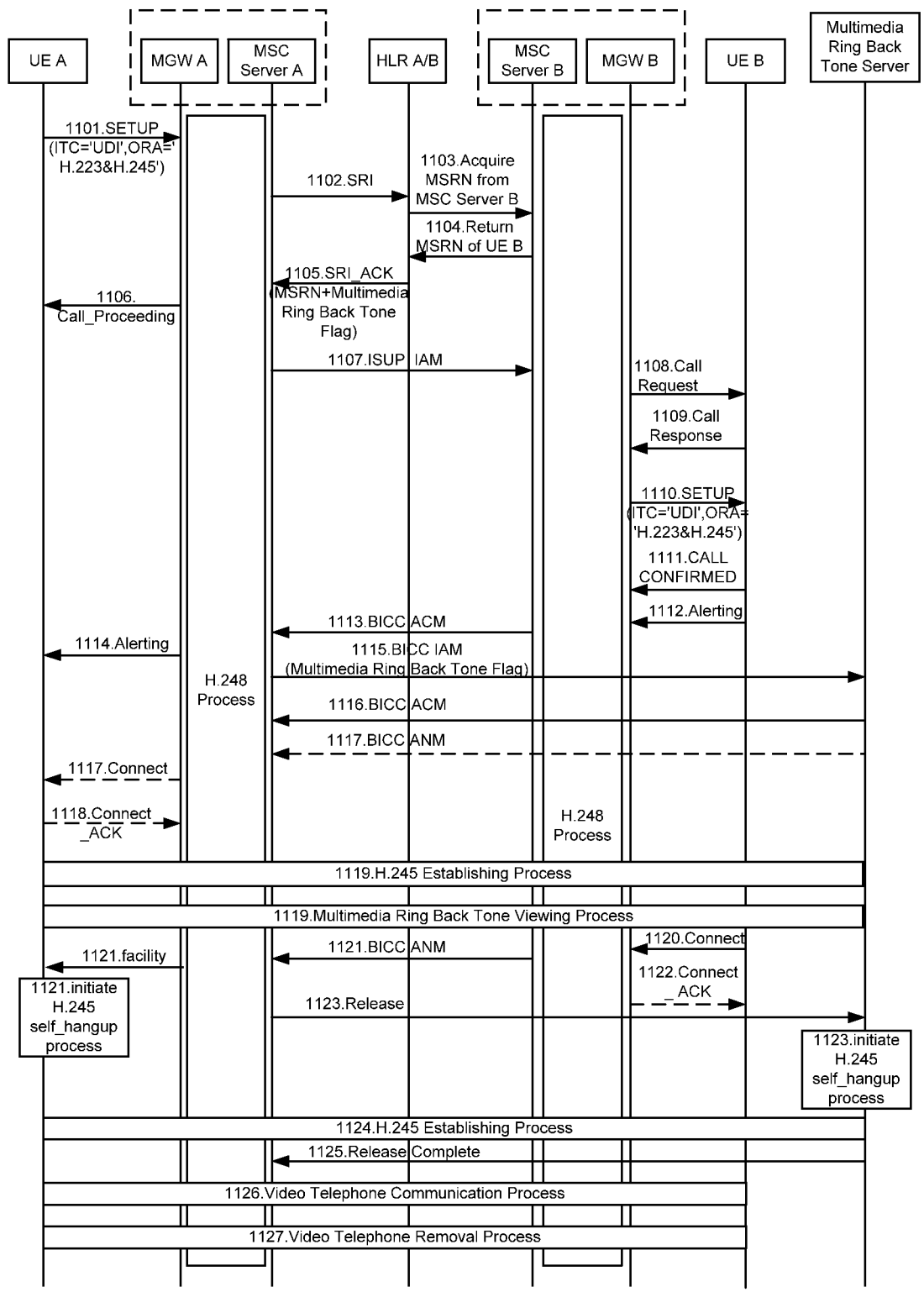
FIG. 11 is a signaling flowchart of a calling method for the video phone in accordance with a ninth embodiment of the present invention.

A ninth embodiment of the present invention relates to a calling method for a video phone. Based on the seventh embodiment, this embodiment achieves the purpose of removing the third bearer of the video phone between the UE A and the Multimedia Ring Back Tone server by initiating H.245 self-hangup processes respectively by the UE A and the Multimedia Ring Back Tone server. The specific flow is shown in FIG. 11.

Steps 1101 to 1120 are completely identical with steps 901 to 920, respectively, and will not be repeated here.

In step 1121, the MSC server B returns a BICC ANM message to the MSC server A. Moreover, the MSC server A sends a facility message to UE A. After receiving the facility message, the UE A initiates an H.245 self-hangup process (without sending the hangup signaling "End Session" to the other party of the communication), and releases the local resources directly.

Step 1122 is completely identical with the step 923.

In step 1123, the MSC server A sends a BICC Release message to the Multimedia Ring Back Tone server, which initiates an H.245 self-hangup process (without sending the hangup signaling "End Session" to the other party of the communication) upon receiving this message.

In step 1124, after the H.245 self-hangup process is completed, the UE A initiates the establishment of a second H.245 bearer, i.e., initiating the establishment process of the fourth bearer of the video phone between the UE A and UE B as described in the seventh embodiment.

In step 1125, the Multimedia Ring Back Tone server returns a BICC Release Complete message to the MSC server A.

Steps 1126 and 1127 are completely identical with steps 927 and 928, respectively, and will not be repeated here.

It is apparent that, this embodiment differs from the seventh embodiment in that the network side distributes a prompt message (i.e., the facility message above) to the calling terminal, indicating the calling terminal that the playback process of the Multimedia Ring Back Tone service ends, and requiring the calling terminal to establish the second H.245 bearer. The calling terminal may initiate a self-hangup process upon receiving this prompt message. In this way, the first H.245 bearer established with the Multimedia Ring Back Tone server ends in terms of hanging up the communication link by the calling terminal Such process is coincident with the normal communication flow, and further reduces the whole duration of network continuation, thereby reducing the time spent in switching between services, and improving the experience of the users.

The whole Multimedia Ring Back Tone service may be viewed as two communications, with the first communication being the Multimedia Ring Back Tone service and the second being the normal communication of the video phone. The calling terminal ends the session of the whole Multimedia Ring Back Tone by self-hanging up according to the prompt message distributed from the network side, and initiates an establishment process of a new H.245 bearer for the video phone communication after self-hanging up the session, so as to achieve the normal video phone communication successfully.

In step 1123, the Multimedia Ring Back Tone server initiates a self-hangup process upon receiving the BICC Release Complete message from the MSC server A. The Multimedia Ring Back Tone server may serve as a logic terminal during the whole Multimedia Ring Back Tone service, for providing the content of the Multimedia Ring Back Tone. After the process of providing the content of the Multimedia Ring Back Tone ends, the Multimedia Ring Back Tone server may participate in the whole process of removing the Multimedia Ring Back Tone bearer as a party of the session.

The self-hangup process initiated by the UE A accomplishes the substantially similar function as the self-hangup process initiated by the Multimedia Ring Back Tone server (i.e., removing the bearer between the UE A and the Multimedia Ring Back Tone server). Therefore, the self-hangup process may be initiated in the UE A only, or in the Multimedia Ring Back Tone server only. However, for consideration of the cooperation of the whole system and to reduce the possibility of system error as possible, self-hangup processes may be initiated in the UE A and in the Multimedia Ring Back Tone server respectively. Moreover, the two self-hangup processes have no strict order in practical applications. Further, in step 1123 of the present embodiment, the MSC server A sending the BICC Release message to the Multimedia Ring Back Tone server is essentially used to instruct the Multimedia Ring Back Tone server to perform the self-hangup process. Accordingly, step 1123 may be omitted if the Multimedia Ring Back Tone server does not perform the self-hangup process.

It is apparent that in the first to sixth embodiments of the present invention, after the whole Multimedia Ring Back Tone service finishes, the Multimedia Ring Back Tone server still resides in the subsequent communication process of the video phone, serving as a back-to-back server. For convenience of description, this scheme is referred to as a bridging scheme. In the seventh to ninth embodiments of the present invention, after the whole Multimedia Ring Back Tone service finishes, the communication link between the Multimedia Ring Back Tone server and the calling terminal is removed, and a communication link for the video phone is to be established between the calling terminal and the called terminal. The most significant feature in this scheme is that the calling terminal establishes H.245 bearers with the Multimedia Ring Back Tone server and the called terminal respectively. For convenience of description, this scheme is referred to as a non-bridging scheme.

A tenth embodiment of the present invention relates to a calling method for a video phone, and is a combination of the bridging scheme in the first to sixth embodiments of the present invention and the non-bridging scheme in the seventh to ninth embodiments of the present invention.

In particular, the calling terminal carries the type of Multimedia Ring Back Tone schemes supported by this terminal (i.e., supporting the bridging scheme or the non-bridging scheme) in the SETUP message sent to the MSC server A. For example, whether the terminal supports the bridging scheme or the non-bridging scheme may be indicated by the value of the User-User field in the SETUP message. It may be defined in advance that, the User-User field being 0 represents that the terminal supports the bridging scheme and the User-User field being 1 represents that the terminal supports the non-bridging scheme.

If the network side recognizes that the calling terminal supports the bridging scheme, the subsequent flow may be identical with either one of the first to sixth embodiments above; if the network side recognizes that the calling terminal supports the non-bridging scheme, the subsequent flow may be identical with either one of the seventh to ninth embodiments above, which will not be repeated here.

Figure 12:
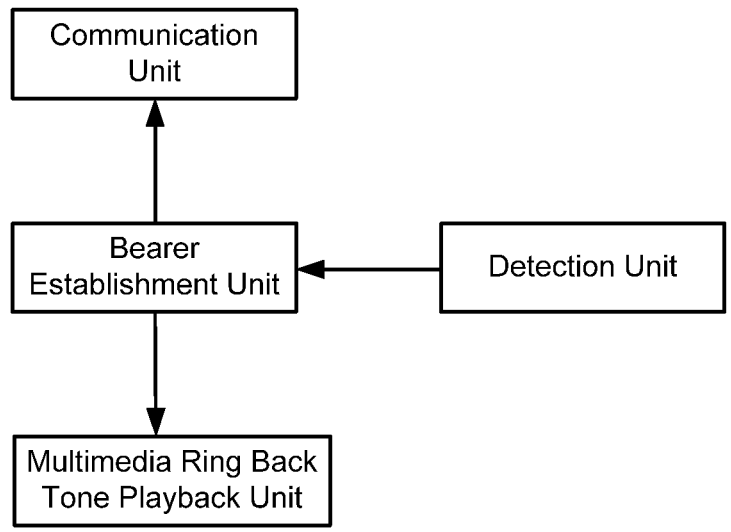
FIG. 12 is a block diagram of a calling system for the video phone in accordance with an eleventh embodiment of the present invention.

An eleventh embodiment of the present invention relates to a calling system for a video phone, as shown in FIG. 12, including: a bearer establishment unit, for establishing a first bearer of a video phone between a calling terminal and a Multimedia Ring Back Tone server; a Multimedia Ring Back Tone playback unit, for playing the Multimedia Ring Back Tone to the calling terminal via the first bearer established by the bearer establishment unit; a detection unit, for detecting whether the called terminal answers the call, and indicating the bearer establishment unit that the called terminal has answered the call upon detecting that the called terminal answers the call, wherein the bearer establishment unit is further configured to establish a second bearer of the video phone between the called terminal and the Multimedia Ring Back Tone server upon receiving this indication from the detection unit; a communication unit, for performing a video phone communication between the calling terminal and the called terminal via the first bearer and the second bearer established by the bearer establishment unit. In this way, the Multimedia Ring Back Tone service may be achieved based on the prior network framework for the video phone. Moreover, by playing the Multimedia Ring Back Tone to the calling terminal by the Multimedia Ring Back Tone playback unit, it avoids the reconstruction of the protocol layer for the terminals, thereby minimizing the effect on the terminals caused by implementing the Multimedia Ring Back Tone service of the video phone.

The Multimedia Ring Back Tone playback unit is within the Multimedia Ring Back Tone server, and the bearer establishment unit establishes the first and second bearers through the video phone signaling protocol processes. The video phone signaling protocol may be a video phone signaling protocol of H.324, H.323, or SIP.

It is worth to mention that the calling system for the video phone in this embodiment may further include a charging unit for charging for the video phone communication, wherein the detection unit is further configured to indicate to the charging unit that the called terminal has answered the call upon detecting that the called terminal answers the call, and the charging unit starts to charging for the video phone communication upon receiving this indication. Therefore, the communication duration may be calculated and controlled accurately in the implementing process of the Multimedia Ring Back Tone service.

The calling system for the video phone in this embodiment may further include a notify unit for notifying the calling terminal to ignore the charging or timing, and for notifying the calling terminal to start charging or timing. The detection unit is further configured to indicate to the notify unit that the called terminal has answered the call upon detecting that the called terminal answers the call. The notify unit notifies the calling terminal to ignore the charging or timing before receiving this indication from the detection unit, and notifies the calling terminal to start charging or timing up receiving this indication from the detection unit. Therefore, the calling terminal may accurately acquire the communication duration calculated on the network side, so as to avoid the user of the calling terminal misunderstanding the charging information.

Figure 13:
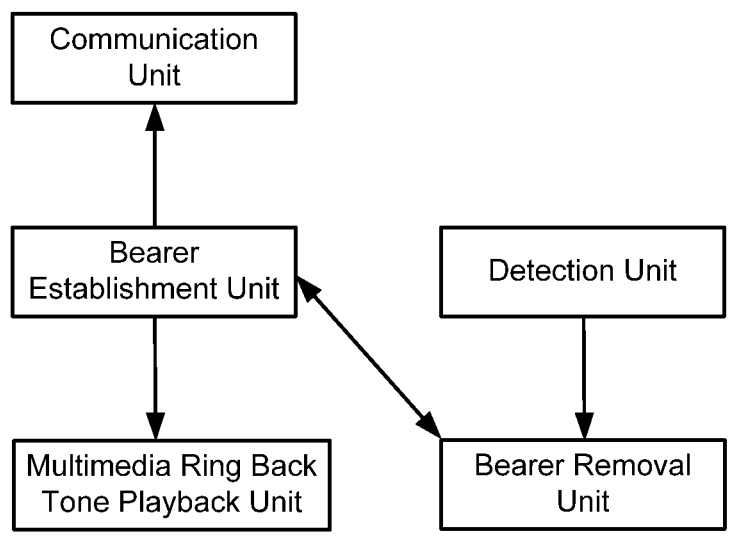
FIG. 13 is a block diagram of a calling system for the video phone in accordance with a twelfth embodiment of the present invention.

A twelfth embodiment of the present invention relates to a calling system for a video phone, as shown in FIG. 13, including: a bearer establishment unit, for establishing a third bearer of the video phone between a calling terminal and a Multimedia Ring Back Tone server, and establishing a fourth bearer of the video phone between the calling terminal and the called terminal; a Multimedia Ring Back Tone playback unit, for playing the Multimedia Ring Back Tone to the calling terminal via the third bearer established by the bearer establishment unit; a communication unit, for performing a video phone communication between the calling terminal the called terminal via the fourth bearer established by the bearer establishment unit. In this way, the Multimedia Ring Back Tone service may be achieved based on the prior network framework for the video phone.

The calling system for the video phone in this embodiment may further include a detection unit for detecting whether the called terminal answers the call, and a bearer removal unit for removing the bearers.

If the third and fourth bearers are Circuit Switch Data (CSD) links, and the third bearer may be decomposed into a fifth bearer from the calling terminal to the MSC server of the calling terminal and a sixth bearer from the MSC server of the calling terminal to the Multimedia Ring Back Tone server while the fourth bearer may be decomposed into the fifth bearer and a seventh bearer from the MSC server of the calling terminal to the called terminal, then upon detecting that the called terminal answers the call, the detection unit indicates to the bearer removal unit that the called terminal has answered the call, wherein the bearer removal unit removes the sixth bearer from the MSC server of the calling terminal to the Multimedia Ring Back Tone server after receiving this indication.

If the third and fourth bearers are video phone communication links established through a video phone protocol of H.324, H.323, or SIP, then upon detecting that the called terminal answers the call, the detection unit indicates to the bearer removal unit that the called terminal has answered the call, wherein the bearer removal unit removes the third bearer established by the bearer establishment unit after receiving this indication, and instructs the bearer establishment unit to establish the fourth bearer.

As can be seen, the circuits occupied by the Multimedia Ring Back Tone server may be released immediately when the user communication is connected (i.e., the detection unit detects that the called terminal answers the call), thereby effectively saving the limited circuit resources.

As described above, in the embodiments of the present invention, the Multimedia Ring Back Tone server plays a Multimedia Ring Back Tone for the calling terminal by the first bearer of a video phone established between the calling terminal and the Multimedia Ring Back Tone server. Upon detecting that the called terminal answers the call, a second bearer of the video phone is established between the calling terminal and the Multimedia Ring Back Tone server. The video phone communications may be performed between the calling terminal and the called terminal via the first bearer and the second bearer established. Or, the Multimedia Ring Back Tone server plays a Multimedia Ring Back Tone for the calling terminal by a third bearer of the video phone established between the calling terminal and the Multimedia Ring Back Tone server. A fourth bearer of the video phone is established between the calling terminal and the called terminal, and the video phone communication is performed between the calling terminal and the called terminal via the fourth bearer. In this way, the Multimedia Ring Back Tone service may be achieved based on the prior network framework for the video phone. Moreover, by playing the Multimedia Ring Back Tone to the calling terminal by the Multimedia Ring Back Tone server, it avoids the reconstruction of the protocol layer for the terminals, thereby minimizing the effect on the terminals caused by implementing the Multimedia Ring Back Tone service of the video phone.

Since the video phone communication is charged upon detecting that the called terminal answers the call (or the establishment of the fourth bearer is completed), the communication duration may be calculated and controlled accurately in the implementing process of the Multimedia Ring Back Tone service.

The calling terminal is notified to ignore the charging or timing before detecting that the called terminal answers the call, and is notified to start charging or timing upon detecting that the called terminal answers the call, so that the calling terminal may accurately acquire the communication duration calculated on the network side, so as to avoid the misunderstanding of the user of the calling terminal on the charging information.

In the scheme of performing the video phone communication via the fourth bearer, before establishing the fourth bearer of the video phone, the third bearer established between the calling terminal and the Multimedia Ring Back Tone server is to be removed upon detecting that the called terminal answers the call, so that the circuits occupied by the Multimedia Ring Back Tone server may be released immediately when the user communication is connected, thereby saving the limited circuit resources.

As will be apparent to one of ordinary skill in the art, the various embodiments described above may be physically implemented using hardware (e.g., processors, ASICs, memory devices) or a combination of hardware and software.

Although the present invention has been illustrated and described with reference to specific embodiments thereof, it should be understood that various modifications may be made thereto in forms and details, without departing from the scope of the present invention.

What is claimed is:

1. A method for performing a video phone call, comprising:

establishing, by a calling terminal, a first bearer of the video phone call between the calling terminal and a Multimedia Ring Back Tone (MRBT) device;

playing, by the MRBT device, a MRBT to the calling terminal via the first bearer between the calling terminal and the MRBT device;

upon a called terminal answering the video phone call, sending, by an originating Mobile Switching Center (MSC) server, the calling terminal a prompt message that prompts the calling terminal to release the first bearer between the calling terminal and the MRBT device and establish a second bearer between the calling terminal and the called terminal;

after receiving the prompt message sent by the originating MSC server, performing, by the calling terminal, the following: releasing the first bearer of the video phone call between the calling terminal and the MRBT device, and thereafter, establishing the second bearer of the video phone call between the calling terminal and the called terminal; and performing, by the calling terminal, a video phone call communication between the calling terminal and the called terminal via the second bearer of the video phone call between the calling terminal and the called terminal.

2. The method of claim 1, wherein the MRBT device is a MRBT server.

3. The method of claim 1, further comprising: before releasing the first bearer between the calling terminal and the MRBT device, sending, by a terminating MSC server, an Answer Message to the originating MSC server.

4. The method of claim 1, further comprising: after performing the video phone call communication,
releasing, by the calling terminal, the second bearer between the calling terminal and the called terminal after the video phone call communication is finished.

5. The method of claim 1, wherein the first bearer between the calling terminal and the MRBT device or the second bearer between the calling terminal and the called terminal is established through a multimedia communication control signaling protocol H.245 process.

6. The method of claim 1, wherein the releasing, by the calling terminal, the first bearer of the video phone call between the calling terminal and the MRBT device comprises:
initiating, by the calling terminal, a self-hangup process and releasing local resources.

7. The method of claim 6, wherein the step of establishing the second bearer of the video phone call between the calling terminal and the called terminal comprises:
after the calling terminal finishes the self-hangup process, initiating, by the calling terminal, an establishment of the second bearer of the video phone call between the calling terminal and the called terminal.

8. The method of claim 1, further comprising:
sending, by the originating MSC server, a release message to the MRBT device after the calling terminal releases the first bearer of the video phone call between the calling terminal and the MRBT device; and
initiating, by the MRBT device, a self-hangup process upon receiving the release message.

9. A method for performing a video phone call by a calling terminal, comprising:
establishing a first bearer of the video phone call between the calling terminal and a Multimedia Ring Back Tone (MRBT) device;
receiving a MRBT from the MRBT device via the first bearer between the calling terminal and the MRBT device;
receiving a prompt message from an originating Mobile Switching Center (MSC) server upon a called terminal answering the video phone call, wherein the prompt message prompts the calling terminal to release the first bearer between the calling terminal and the MRBT device, and establish a second bearer between the calling terminal and the called terminal;
upon receiving the prompt message from the originating MSC server, performing the following: releasing the first bearer between the calling terminal and the MRBT device, and thereafter, establishing the second bearer of the video phone call between the calling terminal and the called terminal; and performing a video phone call communication between the calling terminal and the called terminal via the second bearer between the calling terminal and the called terminal.

10. The method of claim 9, wherein the MRBT device is a MRBT server.

11. The method of claim 9, further comprising: after performing the video phone call communication,
releasing the second bearer between the calling terminal and the called terminal after the video phone call communication is finished.

12. The method of claim 9, wherein the first bearer between the calling terminal and the MRBT device or the second bearer between the calling terminal and the called terminal is established through a multimedia communication control signaling protocol H.245 process.

13. The method of claim 9, wherein the releasing the first bearer of the video phone call between the calling terminal and the MRBT device upon receiving the prompt message comprises:
initiating a self-hangup process and releasing local resources after receiving the prompt message.

14. The method of claim 13, wherein the step of establishing the second bearer of the video phone call between the calling terminal and the called terminal comprises:
initiating an establishment of the second bearer of the video phone call between the calling terminal and the called terminal, after the calling terminal finishes the self-hangup process.

15. A calling terminal, comprising:
a processor coupled to a memory and configured to:
establish a first bearer of a video phone call between the calling terminal and a Multimedia Ring Back Tone (MRBT) device;
receive a MRBT from the MRBT device via the first bearer between the calling terminal and the MRBT device;
receive a prompt message from an originating Mobile Switching Center (MSC) server upon a called terminal answering the video phone call, wherein the prompt message prompts the calling terminal to release the first bearer between the calling terminal and the MRBT device, and establish a second bearer between the calling terminal and the called terminal;
upon receiving the prompt message from the originating MSC server, perform the following: releasing the first bearer between the calling terminal and the MRBT device, and thereafter, establish the second bearer of the video phone call between the calling terminal and the called terminal; and
perform a video phone call communication between the calling terminal and the called terminal via the second bearer between the calling terminal and the called terminal.

16. The calling terminal of claim 15, wherein the MRBT device is a MRBT server.

17. The calling terminal of claim 15, wherein the processor is further configured to release the first bearer between the calling terminal and the called terminal after the video phone call communication is finished.

18. The calling terminal of claim 15, wherein the first bearer between the calling terminal and the MRBT device or the second bearer between the calling terminal and the called terminal is established through a multimedia communication control signaling protocol H.245 process.

19. The calling terminal of claim 15, wherein the processor is configured to initiate a self-hangup process and release local resources after receiving the prompt message.

20. The calling terminal of claim 19, wherein the processor is configured to initiate an establishment of the second bearer of the video phone call between the calling terminal and the called terminal, after the finishing the self-hangup process.

21. A system for performing a video phone call, comprising:
a calling terminal configured to:
establish a first bearer of the video phone call between the calling terminal and a Multimedia Ring Back Tone (MRBT) device;
receive a MRBT from the MRBT device via the first bearer between the calling terminal and the MRBT device;
receive a prompt message from an originating Mobile Switching Center (MSC) server, wherein the prompt message prompts the calling terminal to release the first bearer between the calling terminal and the MRBT device, and establish a second bearer between the calling terminal and the called terminal;
upon receiving the prompt message, perform the following: releasing the first bearer of the video phone call between the calling terminal and the MRBT device; and thereafter, establishing the second bearer of the video phone call between the calling terminal and the called; and
perform a video phone call communication between the calling terminal and the called terminal via the second bearer between the calling terminal and the called terminal;
the MRBT device which is configured to play a MRBT to the calling terminal via the first bearer between the calling terminal and the MRBT device; and
the MSC server which is configured to send the prompt message to the calling terminal upon a called terminal answering the video phone call.

22. The system of claim 21, wherein the system further comprises a terminating MSC server which is configured to send an Answer Message to the originating MSC server.

23. The system of claim 21, wherein the first bearer between the calling terminal and the MRBT device or the second bearer between the calling terminal and the called terminal is established through a multimedia communication control signaling protocol H.245 process.

24. The system of claim 21, wherein the calling terminal is configured to initiate a self-hangup process and releasing local resources directly after receiving the prompt message.

25. The system of claim 24, wherein:
the originating MSC server is further configured to send a release message to the MRBT device; and
the MRBT device is further configured to initiate a self-hangup process upon receiving the release message.

26. The system of claim 24, wherein the calling terminal is configured to initiate an establishment of the second bearer of the video phone call between the calling terminal and the called terminal after the calling terminal finishes the self-hangup process.

* * * * *